United States Patent
Shen et al.

(10) Patent No.: US 11,871,352 B2
(45) Date of Patent: *Jan. 9, 2024

(54) METHOD FOR MONITORING PDCCH, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Jia Shen, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,597

(22) Filed: Oct. 28, 2022

(65) Prior Publication Data

US 2023/0108344 A1 Apr. 6, 2023

Related U.S. Application Data

(63) Continuation of application No. 17/032,974, filed on Sep. 25, 2020, now Pat. No. 11,665,642, which is a (Continued)

(30) Foreign Application Priority Data

Mar. 28, 2018 (WO) ................ PCT/CN2018/080936

(51) Int. Cl.
*H04W 52/02* (2009.01)
*H04W 76/28* (2018.01)
*H04W 72/23* (2023.01)

(52) U.S. Cl.
CPC ... *H04W 52/0235* (2013.01); *H04W 52/0216* (2013.01); *H04W 72/23* (2023.01); *H04W 76/28* (2018.02)

(58) Field of Classification Search
CPC ......... H04W 52/0235; H04W 52/0216; H04W 72/23; H04W 76/28; H04W 52/0209;
(Continued)

(56) References Cited

U.S. PATENT DOCUMENTS

2010/0135159 A1 6/2010 Chun
2013/0336301 A1 12/2013 Deng
(Continued)

FOREIGN PATENT DOCUMENTS

CN 102036346 A 4/2011
CN 102546074 A 7/2012
(Continued)

OTHER PUBLICATIONS

3GPP TSG RAN WG1 Meeting #90; R1-1712806, Source: Qualcomm Incorporated; Title: Efficient monitoring of DL control channels; Prague, Czechia, Aug. 21-25, 2017. (Year: 2017).*
(Continued)

*Primary Examiner* — Mohammed S Chowdhury
(74) *Attorney, Agent, or Firm* — PERKINS COIE LLP

(57) ABSTRACT

Embodiments of the present application provide a method for monitoring a PDCCH, a terminal device, and a network device, capable of reducing power consumption when a terminal device monitors a PDCCH. The method comprises: a terminal device receiving a first message sent by a network device, the first message indicating a first time duration and/or whether to monitor a PDCCH within the first time duration; and the terminal device monitoring the PDCCH according to the first message.

14 Claims, 4 Drawing Sheets

Related U.S. Application Data continuation of application No. PCT/CN2019/074661, filed on Feb. 2, 2019.

(58) Field of Classification Search
CPC ......... H04W 52/0229; H04W 52/0248; H04W 24/08; H04W 52/0212; H04L 5/0053; Y02D 30/70

See application file for complete search history.

(56) References Cited

U.S. PATENT DOCUMENTS

| | | | |
|---|---|---|---|
| 2014/0211655 A1 | 7/2014 | Yoo | |
| 2015/0092563 A1 | 4/2015 | Tabet et al. | |
| 2015/0092646 A1 | 4/2015 | Tabet | |
| 2015/0365154 A1 | 12/2015 | Davydov | |
| 2017/0202025 A1 | 7/2017 | Ouchi et al. | |
| 2017/0265248 A1 | 9/2017 | Narasimha et al. | |
| 2018/0332549 A1* | 11/2018 | Bhattad | H04W 56/001 |
| 2020/0214078 A1* | 7/2020 | Jiang | H04W 76/28 |
| 2020/0221508 A1 | 7/2020 | Huang et al. | |
| 2020/0245395 A1 | 7/2020 | Zhang et al. | |

FOREIGN PATENT DOCUMENTS

| | | |
|---|---|---|
| CN | 102655666 A | 9/2012 |
| CN | 103368763 A | 10/2013 |
| CN | 104244380 A | 12/2014 |
| CN | 104469902 A | 3/2015 |
| CN | 104703263 A | 6/2015 |
| CN | 106533633 A | 3/2017 |
| JP | 2011050087 A | 3/2011 |
| KR | 20150127462 A | 11/2015 |
| KR | 1020150127462 A | 11/2015 |
| WO | 2017122135 A1 | 7/2017 |

OTHER PUBLICATIONS

3GPP TSG RAN WG2 NR #99; R2-1709652; Source: Qualcomm Incorporated, Apple, OPPO; Title: Wake-Up Signaling for C-DRX Mode; Aug. 21-25, 2017, Berlin, Germany (Year: 2017).*
3GPP TSG RAN WG1 Meeting #92—Athens, Greece, Feb. 26-Mar. 2, 2018—R1-1801925—Samsung, DL power consumption reduction for eMTC (7 pages).
3GPP TSG RAN WG1 Meeting #92—Athens, Greece, Feb. 26-Mar. 2, 2018—R1-1802163—LG Electronics, Discussion on wake up signal in MTC (8 pages).
3GPP TSG RAN WGI Meeting #91—Reno, USA, Nov. 27-Dec. 1, 2017—RI-1719832—Huawei, HiSilicon, Designs for UE power saving (3 pages).
EPO, Extended European Search Report for European Patent Application No. 19776066.3, dated Apr. 13, 2021. 11 pages.
Examination Report for Indian Application No. 202027044929 dated Sep. 17, 2021. 6 pages with English translation.
Examination Report No. 1 for Australian Application No. 2019241028 dated Dec. 9, 2021. 3 pages.
Final Office Action dated May 16, 2022 of U.S. Appl. No. 17/032,974, filed Sep. 25, 2022.
First Office Action of the European application No. 19776066.3, dated Mar. 3, 2022. 5 pages.
First Office Action of the Taiwanese application No. 108110638, dated Mar. 22, 2022. 30 pages with English Translation.
International Search Report dated Dec. 28, 2018 of PCT/CN2018/080936 (4 pages).
International Search Report OS dated May 2019 of PCT/CN2019/074661 (4 pages).
Non-Final Office Action dated Feb. 3, 2022 of U.S. Appl. No. 17/032,974, filed Sep. 25, 2022.
Notice of Allowance dated Aug. 31, 2022 of U.S. Appl. No. 17/032,974, filed Sep. 25, 2022.
Corrected Notice of Allowability dated Sep. 7, 2022 of U.S. Appl. No. 17/032,974, filed Sep. 25, 2022.
Notification of Reason for Refusal for Korean Application No. 10-2020-7029934 dated Jan. 11, 2022. 11 pages with English translation.
OPPO;. "Considerations on the DL Power Consumption Reduction for EfeMTC;" 3GPP TSG RAN WG1 Meeting #92, RI-1802139;, Mar. 2, 2018 (Mar. 2, 2018),sections 2-3 (4 pages).
Second Office Action of the Australian application No. 2019241028, dated May 20, 2022. 4 pages.
Examination Report No. 3 for Australian Application No. 2019241028 dated Jul. 29, 2022. 4 pages.
Written Opinion dated Dec. 28, 2018 of PCT/CN2018/080936. 6 pages with English X translation.
Written Opinion dated May 8, 2019 of PCT/CN2019/074661. 9 pages with English translation.
Notice of Allowance for Korean Application No. 10-2020-7029934 dated Jul. 29, 2022. 3 pages with English translation.
3GPP TSG RAN WG1 Meeting #76bis—R1-141134—Shenzhen, China, Mar. 31-Apr. 4, 2014—Huawei, HiSilicon, Uplink Power allocation in Dual connectivity. 4 pages.
Corrected Notice of Allowance for U.S. Appl. No. 17/032,974 dated Jan. 5, 2023. 4 pages.
Notice of Reasons for Refusal for Japanese Application No. 2020-550664 dated Dec. 16, 2022. 8 pages with English translation.
Office Action for Taiwanese Application No. 108110638 dated Jan. 6, 2023. 4 pages with English translation.
Notice of Allowance of the KR application No. 10-2022-7037919, dated Jun. 7, 2023. 4 pages with English translation.
Examination Report of the EP application No. 19776066.3, dated Jul. 10, 2023. 8 pages.
First Office Action of the CN application No. 202210709380.0, dated Jun. 13, 2023. 14 pages with English translation.
Second Office Action of the Chinese application No. 202210709380.0, dated Sep. 26, 2023. 9 pages.

* cited by examiner

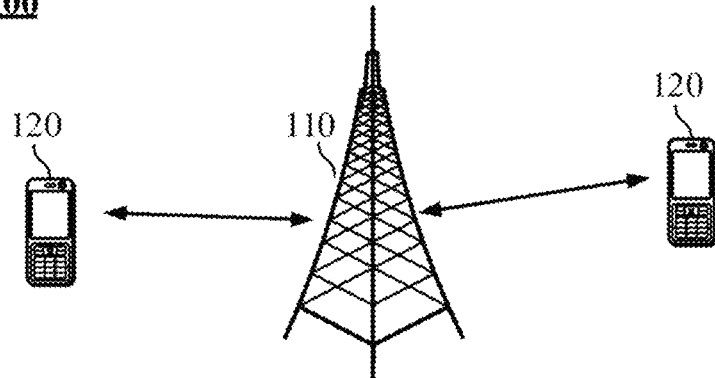

FIG. 1

```
200  A terminal device receives a first message sent by a network device, the
     first message indicates a first time length, and/or indicates whether      ~ S210
     to monitor PDCCH within the first time length.

The terminal device monitors the PDCCH
            according to the first message.                                     ~ S220
```

FIG. 2

```
300  A network device sends a first message to a terminal device, the first
     message indicates a first time length, and/or indicates whether to         ~ S310
     monitor PDCCH within the first time length.

The network device sends the PDCCH for the
            terminal device according to the first message.                     ~ S320
```

FIG. 3

METHOD FOR MONITORING PDCCH, TERMINAL DEVICE, AND NETWORK DEVICE

This application is a continuation application of U.S. application Ser. No. 17/032,974, filed on Sep. 25, 2020, which is a continuation application of International PCT Application No. PCT/CN2019/074661, having an international filing date of Feb. 2, 2019, which claims the priority to PCT Patent Application No. PCT/CN2018/080936, entitled "Method for Monitoring PDCCH, Terminal device, and Network Device", filed to the CNIPA on Mar. 28, 2018. The present application claims priority and the benefit of the above-identified applications and the above-identified applications are incorporated by reference herein in their entirety.

TECHNICAL FIELD

The present disclosure relates to the field of communications, and more particularly to a method for monitoring Physical Downlink Control Channel (PDCCH), a terminal device and a network device.

BACKGROUND

In the 5-Generation New Radio (5G NR), a terminal device in a Radio Resource Control (RRC) connection state needs to continuously monitor Physical Downlink Control Channel (PDCCH) based on configuration of a PDCCH monitoring window. However, a network device only initiates scheduling to the terminal device on a small quantity of slots on the PDCCH monitoring window. In other words, that the terminal device monitors continuously the PDCCH based on the configuration of the PDCCH monitoring window will cause power waste. How to reduce power consumption when the terminal device monitors the PDCCH is an urgent problem to be solved.

SUMMARY

Implementations of the present disclosure provide a method for monitoring Physical Downlink Control Channel (PDCCH), a terminal device, and a network device, by which power consumption can be reduced when the terminal device monitors PDCCH.

In a first aspect, an implementation of the present disclosure provides a method for monitoring a PDCCH. The method includes: receiving, by a terminal device, a first message sent by a network device, wherein the first message indicates a first time length, and/or indicates whether to monitor a PDCCH within the first time length; monitoring, by the terminal device, the PDCCH according to the first message.

Therefore, in the method for monitoring a PDCCH according to an implementation of the present disclosure, the terminal device may monitor the PDCCH according to the first message indicating the first time length and/or whether to monitor the PDCCH within the first time length, to avoid power waste caused by continuously monitoring the PDCCH based on the configuration of a PDCCH monitoring window, thereby reducing power consumption when the terminal device monitors the PDCCH.

Optionally, in one implementation of the first aspect, receiving, by the terminal device, the first message sent by the network device, includes: receiving periodically, by the terminal device, the first message sent by the network device.

Optionally, in one implementation of the first aspect, the period in which the terminal device receives the first message is greater than or equal to that in which the terminal device monitors the PDCCH.

Therefore, the terminal device may monitor the PDCCH in at least one PDCCH monitoring window according to the first message, thereby reducing power consumption when the terminal device monitors the PDCCH.

Optionally, in one implementation of the first aspect, if the first message indicates the first time length, monitoring, by the terminal device, the PDCCH according to the first message, includes: determining, by the terminal device, the first time length according to the first message and determining whether to monitor the PDCCH within the first time length according to first configuration information, wherein the first configuration information indicates whether to monitor the PDCCH within the first time length.

Therefore, the terminal device may determine the first time length according to the first message, and determine whether to monitor the PDCCH within the first time length according to the first configuration information, to avoid power waste caused by continuously monitoring the PDCCH based on the configuration of the PDCCH monitoring window, thereby reducing power consumption when the terminal device monitors the PDCCH.

Optionally, in one implementation of the first aspect, before the terminal device determines the first time length according to the first message and determines whether to monitor the PDCCH within the first time length according to the first configuration information, the method further includes: receiving, by the terminal device, the first configuration information sent by the network device through Radio Resource Control (RRC) signaling.

Optionally, in one implementation of the first aspect, the first configuration information is pre-configured to the terminal device.

Optionally, in one implementation of the first aspect, the first message is PDCCH, and the first message indicates the first time length through at least one bit in first Downlink Control Information (DCI) transmitted on the first message; determining, by the terminal device, the first time length according to the first message, includes: determining, by the terminal device, the first time length according to the at least one bit.

Optionally, in one implementation of the first aspect, the first message is an identification sequence, and the first message indicates the first time length through at least one identification sequence; determining, by the terminal device, the first time length according to the first message, includes: determining, by the terminal device, the first time length according to the at least one identification sequence.

Optionally, in one implementation of the first aspect, if the first message indicates whether to monitor the PDCCH within the first time length, and monitoring, by the terminal device, the PDCCH according to the first message, includes: determining, by the terminal device, the first time length according to second configuration information and determining whether to monitor the PDCCH within the first time length according to the first message, wherein the second configuration information indicates the first time length.

Therefore, the terminal device may determine the first time length according to the second configuration information, and determine whether to monitor the PDCCH within the first time length according to the first message, to avoid power waste caused by continuously monitoring the PDCCH based on the configuration of the PDCCH monitoring window, thereby reducing power consumption when the terminal device monitors the PDCCH.

Optionally, in one implementation of the first aspect, before the terminal device determines the first time length according to the second configuration information and determines whether to monitor the PDCCH within the first time length according to the first message, the method further includes: receiving, by the terminal device, the second configuration information sent by the network device through Radio Resource Control (RRC) signaling.

Optionally, in one implementation of the first aspect, the second configuration information is pre-configured to the terminal device.

Optionally, in one implementation of the first aspect, the first message is PDCCH, and the first message indicates whether to monitor the PDCCH within the first time length through a first bit in the first DCI transmitted on the first message. Wherein when the first bit is 0, it indicates to monitor the PDCCH within the first time length, and when the first bit is 1, it indicates not to monitor the PDCCH within the first time length.

Determining, by the terminal device, whether to monitor the PDCCH within the first time length according to the first message includes: if the first bit is 0, determining, by the terminal device, to monitor the PDCCH within the first time length according to the first bit, or, if the first bit is 1, determining, by the terminal device, not to monitor the PDCCH within the first time length according to the first bit.

Optionally, in one implementation of the first aspect, the first message is an identification sequence, and the first message indicates through a first identification sequence to monitor the PDCCH within the first time length, and indicates through a second identification sequence not to monitor the PDCCH within the first time length.

Determining, by the terminal device, whether to monitor the PDCCH within the first time length according to the first message includes: if the first message comprises the first identification sequence, determining, by the terminal device, to monitor the PDCCH within the first time length according to the first identification sequence, or, if the first message comprises the second identification sequence, determining, by the terminal device, not to monitor the PDCCH within the first time length according to the second identification sequence.

Optionally, in one implementation of the first aspect, if the first message indicates the first time length and whether to monitor the PDCCH within the first time length; and monitoring, by the terminal device, the PDCCH according to the first message, includes: determining, by the terminal device, the first time length and whether to monitor the PDCCH within the first time length according to the first message.

Optionally, in one implementation of the first aspect, the first message includes first indication information indicating the first time length and second indication information indicating whether to monitor the PDCCH within the first time length; and determining, by the terminal device, the first time length and whether to monitor the PDCCH within the first time length according to the first message includes: determining, by the terminal device, the first time length according to the first indication information, and determining whether to monitor the PDCCH within the first time length according to the second indication information.

Therefore, the terminal device may determine the first time length according to the first indication information in the first message, and determine whether to monitor the PDCCH within the first time length according to the second indication information in the first message, to avoid power waste caused by continuously monitoring the PDCCH based on the configuration of the PDCCH monitoring window, thereby reducing power consumption when the terminal device monitors the PDCCH.

Optionally, in one implementation of the first aspect, the first message is PDCCH and/or an identification sequence.

Optionally, in one implementation of the first aspect, the first indication information indicates the first time length through at least one bit in the first DCI transmitted on the first message; and determining, by the terminal device, the first time length according to the first indication information, includes: determining, by the terminal device, the first time length according to the at least one bit.

Optionally, in one implementation of the first aspect, the first indication information indicates the first time length through at least one identification sequence; and determining, by the terminal device, the first time length according to the first indication information, includes: determining, by the terminal device, the first time length according to the at least one identification sequence.

Optionally, in one implementation of the first aspect, the second indication information indicates whether to monitor the PDCCH within the first time length through a first bit in the second DCI transmitted on the first message, wherein when the first bit is 0, it indicates to monitor the PDCCH within the first time length, and when the first bit is 1, it indicates not to monitor the PDCCH within the first time length; and determining, by the terminal device, whether to monitor the PDCCH within the first time length according to the second indication information includes: if the first bit is 0, determining, by the terminal device, to monitor the PDCCH within the first time length according to the first bit, or, if the first bit is 1, determining, by the terminal device, not to monitor the PDCCH within the first time length according to the first bit.

Optionally, in one implementation of the first aspect, the second indication information indicates through a first identification sequence to monitor the PDCCH within the first time length, and indicates through a second identification sequence not to monitor the PDCCH within the first time length; and determining, by the terminal device, whether to monitor the PDCCH within the first time length according to the second indication information includes: if the first message comprises the first identification sequence, determining, by the terminal device, to monitor the PDCCH within the first time length according to the first identification sequence, or, if the first message comprises the second identification sequence, determining, by the terminal device, not to monitor the PDCCH within the first time length according to the second identification sequence.

Optionally, in one implementation of the first aspect, a unit of the first time length is a time slot or a millisecond.

Optionally, in one implementation of the first aspect, if the unit of the first time length is the time slot, the first message includes third indication information indicating a subcarrier spacing corresponding to the first time length or indicating that the subcarrier spacing corresponding to the first time length is consistent with the subcarrier spacing corresponding to the PDCCH.

Optionally, in one implementation of the first aspect, the terminal device is in a Radio Resource Control (RRC) connection state.

In a second aspect, an implementation of the present disclosure provides a method for monitoring a PDCCH. The method includes: sending, by a network device, a first message to a terminal device, wherein the first message indicates a first time length, and/or indicates whether to monitor a PDCCH within the first time length; and sending, by the network device, the PDCCH for the terminal device according to the first message.

Therefore, in the method for monitoring PDCCH according to an implementation of the present disclosure, the network device may send the PDCCH for the terminal device according to the first message indicating the first time length and/or whether to monitor the PDCCH within the first time length, to avoid power waste caused by continuously monitoring the PDCCH based on the configuration of the PDCCH monitoring window by the terminal device, thereby reducing power consumption when the terminal device monitors the PDCCH.

Optionally, the network device may determine the first message according to its own scheduling situation. For example, the network device may determine the first message in combination with service load of the current entire system and length prediction of scheduling queues, or service characteristics of the terminal device, time delay requirements or other factors.

Optionally, in one implementation of the second aspect, sending, by the network device, the first message to the terminal device, includes: sending periodically, by the network device, the first message to the terminal device.

Optionally, in one implementation of the second aspect, the period in which the network device sends the first message is greater than or equal to that in which the terminal device monitors the PDCCH.

Optionally, in an implementation of the second aspect, if the first message indicates the first time length, the method further includes: sending, by the network device, first configuration information to the terminal device through Radio Resource Control (RRC) signaling, wherein the first configuration information indicates whether to monitor the PDCCH within the first time length; sending, by the network device, the PDCCH for the terminal device according to the first message includes: determining, by the network device, the first time length according to the first message, and determining whether to send the PDCCH for the terminal device within the first time length according to the first configuration information.

Optionally, in one implementation of the second aspect, the first message is PDCCH, and the first message indicates the first time length through at least one bit in the first DCI transmitted on the first message; determining, by the network device, the first time length according to the first message includes: determining, by the network device, the first time length according to the at least one bit.

Optionally, in one implementation of the second aspect, the first message is an identification sequence, and the first message indicates the first time length through at least one identification sequence; determining, by the network device, the first time length according to the first message includes: determining, by the network device, the first time length according to the at least one identification sequence.

Optionally, in one implementation of the second aspect, if the first message indicates whether to monitor the PDCCH within the first time length, the method further includes: sending, by the network device, second configuration information to the terminal device through RRC signaling, wherein the second configuration information indicates the first time length; sending, by the network device, the PDCCH for the terminal device according to the first message includes: determining, by the network device, the first time length according to the second configuration information, and determining whether to send the PDCCH for the terminal device within the first time length according to the first message.

Optionally, in one implementation of the second aspect, the first message is PDCCH, and the first message indicates whether to monitor the PDCCH within the first time length through a first bit in the first DCI transmitted on the first message. Wherein when the first bit is 0, it indicates to monitor the PDCCH within the first time length, and when the first bit is 1, it indicates not to monitor the PDCCH within the first time length.

Determining, by the network device, whether to send the PDCCH for the terminal device within the first time length according to the first message includes: if the first bit is 0, determining, by the network device, to send the PDCCH for the terminal device within the first time length according to the first bit, or, if the first bit is 1, determining, by the network device, not to send the PDCCH for the terminal device within the first time length according to the first bit.

Optionally, in one implementation of the second aspect, the first message is an identification sequence, and the first message indicates through a first identification sequence to monitor the PDCCH within the first time length, and indicates through a second identification sequence not to monitor within the first time length.

Determining, by the network device, whether to send the PDCCH for the terminal device within the first time length according to the first message includes: if the first message comprises the first identification sequence, determining, by the network device, to send the PDCCH for the terminal device within the first time length according to the first identification sequence, or, if the first message comprises the second identification sequence, determining, by the network device, not to send the PDCCH for the terminal device within the first time length according to the second identification sequence.

Optionally, in one implementation of the second aspect, if the first message indicates the first time length and whether to monitor the PDCCH within the first time length, sending, by the network device, the PDCCH for the terminal device according to the first message includes: determining, by the network device, the first time length and whether to send the PDCCH for the terminal device within the first time length according to the first message.

Optionally, in one implementation of the second aspect, the first message includes first indication information indicating the first time length and second indication information indicating whether to monitor the PDCCH within the first time length; and determining, by the network device, the first time length and whether to send the PDCCH for the terminal device within the first time length according to the first message includes: determining, by the network device, the first time length according to the first indication information, and determining whether to send the PDCCH for the terminal device within the first time length according to the second indication information.

Optionally, in one implementation of the second aspect, the first message is PDCCH and/or an identification sequence.

Optionally, in one implementation of the second aspect, the first indication information indicates the first time length through at least one bit in the first DCI transmitted on the first message; and determining, by the network device, the first time length according to the first indication information includes: determining, by the network device, the first time length according to the at least one bit.

Optionally, in one implementation of the second aspect, the first indication information indicates the first time length through at least one identification sequence; and determining, by the network device, the first time length according to the first indication information includes: determining, by the network device, the first time length according to the at least one identification sequence.

Optionally, in one implementation of the second aspect, the second indication information indicates whether to monitor the PDCCH within the first time length through a first bit in the second DCI transmitted on the first message, wherein when the first bit is 0, it indicates to monitor the PDCCH within the first time length, and when the first bit is 1, it indicates to not monitor the PDCCH within the first time length; and determining, by the network device, whether to send the PDCCH for the terminal device within the first time length according to the second indication information includes: if the first bit is 0, determining, by the network device, to send the PDCCH for the terminal device within the first time length according to the first bit, or, if the first bit is 1, determining, by the network device, not to send the PDCCH for the terminal device within the first time length according to the first bit.

Optionally, in one implementation of the second aspect, the second indication information indicates through a first identification sequence to monitor the PDCCH within the first time length, and indicates through a second identification sequence not to monitor the PDCCH within the first time length; and determining, by the network device, whether to send the PDCCH for the terminal device within the first time length according to the second indication information includes: if the first message comprises the first identification sequence, determining, by the network device, to send the PDCCH for the terminal device within the first time length according to the first identification sequence, or, if the first message comprises the second identification sequence, determining, by the network device, not to send the PDCCH for the terminal device within the first time length according to the second identification sequence.

Optionally, in one implementation of the second aspect, a unit of the first time length is a time slot or a millisecond.

Optionally, in one implementation of the second aspect, if the unit of the first time length is the time slot, the first message includes third indication information indicating a subcarrier spacing corresponding to the first time length or indicating that the subcarrier spacing corresponding to the first time length is consistent with the subcarrier spacing corresponding to the PDCCH.

Optionally, in one implementation of the second aspect, the terminal device is in a Radio Resource Control (RRC) connection state.

In a third aspect, an implementation of the present disclosure provides a method for monitoring a Physical Downlink Control Channel (PDCCH). The method includes: determining, by a terminal device, a first time length according to a first message and a first parameter, wherein the first message indicates a numerical relationship between the first parameter and the first time length, and the first parameter is a Discontinuous Reception (DRX) parameter or a first time parameter; and skipping, by the terminal device, monitoring a PDCCH within the first time length.

Therefore, in the method for monitoring a PDCCH according to an implementation of the present disclosure, the terminal device may determine the first time length according to the first message and the first parameter, and skip monitoring the PDCCH within the first time length, to avoid power waste caused by continuously monitoring the PDCCH based on the configuration of the PDCCH monitoring window, thereby reducing power consumption when the terminal device monitors the PDCCH.

In a fourth aspect, an implementation of the present disclosure provides a method for monitoring a Physical Downlink Control Channel (PDCCH). The method includes: sending, by a network device, a first message to a terminal device, wherein the first message indicates a numerical relationship between a first parameter and a first time length, and the first parameter is a Discontinuous Reception (DRX) parameter or a first time parameter.

Therefore, in the method for monitoring a PDCCH according to an implementation of the present disclosure, the network device may send the first message to the terminal device, so that the terminal device determines the first time length according to the first message and the first parameter, and skips monitoring the PDCCH within the first time length, to avoid power waste caused by continuously monitoring the PDCCH based on the configuration of the PDCCH monitoring window, thereby reducing power consumption when the terminal device monitors the PDCCH.

In a fifth aspect, an implementation of the present disclosure provides a terminal device including a module or unit that may perform the method in the first aspect or any alternative implementation of the first aspect.

In a sixth aspect, an implementation of the present disclosure provides a terminal device including a module or unit that may perform the method in the third aspect or any alternative implementation of the third aspect.

In a seventh aspect, an implementation of the present disclosure provides a network device including a module or unit that may perform the method in the second aspect or any alternative implementation of the second aspect.

In an eighth aspect, an implementation of the present disclosure provides a network device including a module or unit that may perform the method in the fourth aspect or any alternative implementation of the fourth aspect.

In a ninth aspect, a terminal device is provided, and the terminal device includes a processor, a memory, and a communication interface. The processor and the memory are connected with the communication interface. The memory is configured to store instructions, and the processor is configured to execute the instructions, and the communication interface is configured to communicate with other network elements under the control of the processor. When the processor executes the instructions stored in the memory, the execution causes the processor to implement the method in the first aspect or any possible implementation of the first aspect.

In a tenth aspect, a terminal device is provided, and the terminal device includes a processor, a memory, and a communication interface. The processor and the memory are connected with the communication interface. The memory is configured to store instructions, and the processor is configured to execute the instructions, and the communication interface is configured to communicate with other network elements under the control of the processor. When the processor executes the instructions stored in the memory, the execution causes the processor to implement the method in the third aspect or any possible implementation of the third aspect.

In an eleventh aspect, there is provided a network device including a processor, a memory, and a communication interface. The processor and the memory are connected with the communication interface. The memory is configured to store instructions, and the processor is configured to execute the instructions, and the communication interface is configured to communicate with other network elements under the control of the processor. When the processor executes the instructions stored in the memory, the execution causes the processor to implement the method in the second aspect or any possible implementation of the second aspect.

In a twelfth aspect, there is provided a network device including a processor, a memory, and a communication interface. The processor and the memory are connected with the communication interface. The memory is configured to store instructions, and the processor is configured to execute the instructions, and the communication interface is configured to communicate with other network elements under the control of the processor. When the processor executes the instructions stored in the memory, the execution causes the processor to implement the method in the fourth aspect or any possible implementation of the fourth aspect.

In a thirteenth aspect, a computer storage medium is provided, and the computer storage medium has stored program codes for instructing a computer to execute instructions of the method in the first aspect or any possible implementation of the first aspect.

In a fourteenth aspect, a computer storage medium is provided, and the computer storage medium has stored program codes for instructing a computer to execute instructions of the method in the third aspect or any possible implementation of the third aspect.

In a fifteenth aspect, a computer storage medium is provided, and the computer storage medium has stored program codes for instructing a computer to execute instructions of the method in the second aspect or any possible implementation of the second aspect.

In a sixteenth aspect, a computer storage medium is provided, and the computer storage medium has stored program codes for instructing a computer to execute instructions of the method in the fourth aspect or any possible implementation of the fourth aspect.

In a seventeenth aspect, a computer program product including instructions is provided, wherein when being executed on a computer, the computer program product causes the computer to perform the methods described in the above-mentioned various aspects.

BRIEF DESCRIPTION OF DRAWINGS

FIG. 1 is a schematic diagram of an application scenario according to an implementation of the present disclosure.

FIG. 2 is a schematic flowchart of a method for monitoring PDCCH according to an implementation of the present disclosure.

FIG. 3 is a schematic flowchart of another method for monitoring PDCCH according to an implementation of the present disclosure.

DETAILED DESCRIPTION

Figure 4:
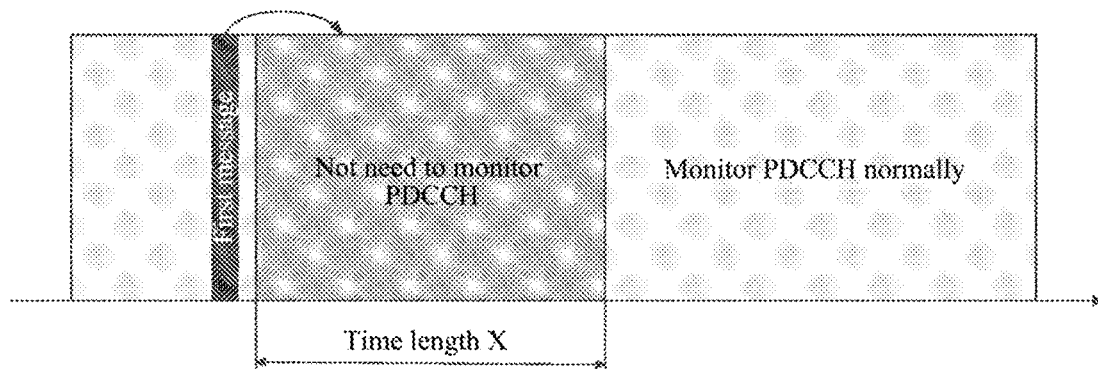
FIG. 4 is a schematic diagram of monitoring PDCCH provided by an implementation of the present disclosure.

Technical solutions in implementations of the present disclosure will be clearly and completely described below with reference to the drawings in the implementations of the present disclosure.

Implementations of the present disclosure may be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an NR system evolution system, a LTE-based access to unlicensed spectrum (LTE-U) system, an NR-based access to unlicensed spectrum (NR-U) system, a Universal Mobile Telecommunications System (UMTS), a Wireless Local Area Network (WLAN), Wireless Fidelity (WiFi), a next generation communication system, or other communication systems.

Generally speaking, the number of connections supported by traditional communication systems is limited and easy to implement. However, with development of the communication technology, mobile communication systems will not only support traditional communication, but also support, for example, Device to Device (D2D) communication, Machine to Machine (M2M) communication, Machine Type Communication (MTC), or Vehicle to Vehicle (V2V) communication. The implementations of the present disclosure may also be applied to these communication systems.

Optionally, the communication system in the implementations of the present disclosure may be applied to a Carrier Aggregation (CA) scenario, a Dual Connectivity (DC) scenario, or a Standalone (SA) scenario.

The applied spectrum is not limited in the implementations of the present disclosure. For example, the implementations of the present disclosure may be applied to licensed spectrum, or unlicensed spectrum.

In the present disclosure, various implementations are described in combination with a network device and a terminal device. Herein the terminal device may also be referred to as a User Equipment (UE), an access terminal, a subscriber unit, a subscriber station, a mobile station, a rover station, a remote station, a remote terminal, a mobile device, a user terminal, a terminal, a wireless communication device, a user agent, or a user device, etc. The terminal device may be a STATION (ST) in the WLAN, or may be a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, or a terminal device in a next generation communication system, such as a terminal device in an NR network or a terminal device in a future evolved Public Land Mobile Network (PLMN).

As an example but not a limitation, in an implementation of the present disclosure, the terminal device may be a wearable device. The wearable device may also be called a wearable intelligent device, which is a general term of wearable devices designed intelligently and developed on daily wear using wearable technology, such as glasses, gloves, watches, clothing and shoes. The wearable device is a portable device that is worn directly on the body or integrated into the user's clothes or accessories. The wearable device not only is a hardware device, but also implements powerful functions through software support, data interaction and cloud interaction. Generalized wearable intelligent devices include a device with full features and a large size and full or partial functions which may be implemented without relying on smart phones, for example, a smart watches or smart glasses, as well as a device that only concentrates on a certain application function and needs to be cooperated with other devices such as a smart phone, for example, various smart bracelets and smart jewelry for physical sign observation.

The network device may be a device for communicating with a mobile device. The network device may be an Access Point (AP) in the WLAN, or a Base Transceiver Station (BTS) in GSM or CDMA, or may be a NodeB (NB) in WCDMA, or an Evolutional Node B (eNB or eNodeB) in Long Term Evolution (LTE), or a relay station or an access point, or a vehicle-mounted device, a wearable device, a network device (gNB) in the NR network, or a network device in the future evolved PLMN network.

In an implementation of the present disclosure, the network device provides services for a cell, and the terminal device communicates with the network device through transmission resources (e.g., frequency domain resources or spectrum resources) used by the cell. The cell may be a cell corresponding to the network device (e.g., a base station), the cell may belong to a macro base station, or may belong to a base station corresponding to a Small cell, here the small cell may include a Metro cell, a Micro cell, a Pico cell, a Femto cell, etc. These small cells have characteristics of small coverage and low transmission power, and are suitable for providing high-speed data transmission services.

FIG. 1 exemplifies one network device and two terminal devices. Optionally, the wireless communication system 100 may include multiple network devices, and another quantity of terminal devices may be included within the coverage area of each network device, and this is not restricted in implementations of the present disclosure.

Optionally, the wireless communication system 100 may further include other network entities such as a Mobility Management Entity (MME), an access and mobility management function (AMF), and this is not restricted in implementations of the present disclosure.

In addition, various aspects or features of the present disclosure may be implemented as methods, apparatuses, or articles of manufacture using standard programming and/or engineering techniques. The term "article of manufacture" used in the present disclosure encompasses a computer program accessible from any computer-readable device, carrier, or medium. For example, the computer-readable medium may include, but is not limited to, a magnetic storage device (such as a hard disk, a floppy disk, or a magnetic tape), a disk (such as a compact disc (CD), a digital versatile disc (Digital Versatile Disc, DVD)), a smart card and a flash storage device (such as an Erasable Programmable Read-Only Storage (EPROM), a card, a stick or a key drive). In addition, various storage mediums described herein may represent one or more devices and/or other machine-readable mediums for storing information. The term "machine-readable medium" may include, but is not limited to, various media capable of storing, containing, and/or carrying instructions and/or data.

In addition, the terms "system" and "network" are often used interchangeably herein. The term "and/or" in this document is merely an association relationship describing associated objects, indicating that there may be three relationships, for example, A and/or B may indicate three situations: A alone, A and B, and B alone. In addition, the symbol "/" in this document generally indicates that objects before and after the symbol "/" has an "or" relationship.

FIG. 2 is a schematic flowchart of a method 200 for monitoring PDCCH according to an implementation of the present disclosure. The method 200 may optionally be applied to the system shown in FIG. 1, but is not limited thereto. The method 200 includes at least some of the following contents.

In S210, a terminal device receives a first message sent by a network device, the first message indicates a first time length, and/or indicates whether to monitor PDCCH within the first time length.

Optionally, the terminal device may be in a Radio Resource Control (RRC) connection state.

Optionally, the terminal device receives periodically the first message sent by the network device. In other words, the network device sends periodically the first message to the terminal device.

Optionally, the period in which the terminal device receives the first message is greater than or equal to that in which the terminal device monitors the PDCCH. Thus, the first message in one period may be used for indicating a PDCCH monitoring behavior in at least one PDCCH period.

It should be understood that the period in which the terminal device monitors the PDCCH is configured, for example, the period in which the terminal device monitors the PDCCH is a period of the PDCCH search space which may be semi-statically configured by the network device to the terminal device.

It should further be understood that the terminal device may continuously monitor the PDCCH based on configuration of the PDCCH monitoring window in a time length other than the first time length, for example, the terminal device may monitor the PDCCH based on configuration information of the PDCCH and/or configuration information of Discontinuous Reception (DRX).

Optionally, a unit of the first time length is a time slot or a millisecond.

Optionally, if the unit of the first time length is the time slot, the first message may further indicate a subcarrier spacing (numerology) corresponding to the first time length, or indicate that the subcarrier spacing corresponding to the first time length is consistent with the subcarrier spacing corresponding to the PDCCH.

For example, the first message includes third indication information indicating the subcarrier spacing corresponding to the first time length or indicating that the subcarrier spacing corresponding to the first time length is consistent with the subcarrier spacing corresponding to the PDCCH.

It should be noted that the first time length is a specific time length, if the network device sends periodically the first message to the terminal device, the first time length indicated by the first message sent by the network device in each period is different.

In S220, the terminal device monitors the PDCCH according to the first message.

Optionally, as an implementation, the first message indicates the first time length. In this case, the terminal device determines the first time length according to the first message and determines whether to monitor the PDCCH within the first time length according to first configuration information. Wherein the first configuration information indicates whether to monitor the PDCCH within the first time length.

It should be noted that the first configuration information may be dynamically configured to the terminal device by the network device through RRC signaling, or the first configuration information may be pre-configured to the terminal device.

For example, when the first message indicates the first time length, the first configuration information may indicate that the PDCCH does not need to be monitored within the first time length, and in this case, the terminal device stops monitoring the PDCCH in the first time length.

For another example, when the first message indicates the first time length, the first configuration information may indicate to monitor the PDCCH within the first time length, and in this case, the terminal device monitors the PDCCH within the first time length.

Optionally, the first message is PDCCH, and the first message indicates the first time length through at least one bit in first Downlink Control Information (DCI) transmitted on the first message, and the terminal device determines the first time length according to the at least one bit.

It should be noted that the first DCI is DCI transmitted on the first message. The first DCI may be DCI containing only the at least one bit, or the at least one bit may be added to a common DCI for uplink and downlink scheduling.

For example, four time lengths may be indicated through 2 bits in the first DCI. For example, 00 indicates a time length of 0, 01 indicates a time length of 2 ms or 2 slots, 10 indicates a time length of 4 ms or 4 slots, and 11 indicates a time length of 16 ms or 16 slots.

Optionally, the first message is an identification sequence, and the first message indicates the first time length through at least one identification sequence, and the terminal device determines the first time length according to the at least one identification sequence.

For example, four time lengths may be indicated through four identification sequences. For example, the identification sequence 1 indicates a time length of 0, the identification sequence 2 indicates a time length of 2 ms or 2 slots, the identification sequence 3 indicates a time length of 4 ms or 4 slots, and the identification sequence 4 indicates a time length of 16 ms or 16 slots.

Optionally, as an implementation, the first message may also indicate the first time length by indicating a numerical relationship between a first parameter and the first time length, wherein the first parameter is a Discontinuous Reception (DRX) parameter or a first time parameter. In this case, the terminal device determines the first time length according to the first message and the first parameter and determines whether to monitor the PDCCH within the first time length according to first configuration information, wherein the first configuration information indicates whether to monitor the PDCCH within the first time length.

Optionally, the first time parameter is notified by the network device or pre-configured. For example, the network device sends the first time parameter to the terminal device through RRC signaling or Media Access Control Control Element (MAC CE) signaling.

Optionally, if the first parameter is the DRX parameter, the first parameter is one of the following:
a drx-on Duration Timer, a drx-Inactivity Timer, a drx-long cycle, and a drx-short cycle.

Assuming that the first parameter is the drx-on Duration Timer, its value may be as follows:
1 ms, 2 ms, 3 ms, 4 ms, 5 ms, 6 ms, 8 ms, 10 ms, 20 ms, 30 ms, 40 ms, 50 ms, 60 ms, 80 ms, 100 ms, 200 ms, 300 ms, 400 ms, 500 ms, 600 ms, 800 ms, 1000 ms, 1200 ms, 1600 ms.

Assuming that the first parameter is the drx-long cycle, its value may be as follows:
10 ms, 20 ms, 32 ms, 40 ms, 60 ms, 64 ms, 70 ms, 80 ms, 128 ms, 160 ms, 256 ms, 320 ms, 512 ms, 640 ms, 1024 ms, 1280 ms, 2048 ms, 2560 ms, 5120 ms, 10240 ms.

Assuming that the first parameter is the drx-short cycle, its value may be as follows:
2 ms, 3 ms, 4 ms, 5 ms, 6 ms, 7 ms, 8 ms, 10 ms, 14 ms, 16 ms, 20 ms, 30 ms, 32 ms, 35 ms, 40 ms, 64 ms, 80 ms, 128 ms, 256 ms, 320 ms, 512 ms, 640 ms.

The first time parameter may be, for example, 20 ms.

Optionally, if the first parameter is the DRX parameter, the first parameter may be configured by the network device through RRC signaling or a Media Access Control Control Element (MAC CE).

It should be noted that the first configuration information may be dynamically configured to the terminal device by the network device through RRC signaling, or the first configuration information may be pre-configured to the terminal device.

For example, when the first message indicates the first time length by indicating the numerical relationship between the first parameter and the first time length, the first configuration information may indicate that the PDCCH does not need to be monitored within the first time length, and in this case, the terminal device stops monitoring the PDCCH within the first time length.

For another example, when the first message indicates the first time length by indicating the numerical relationship between the first parameter and the first time length, the first configuration information may indicate to monitor the PDCCH within the first time length, and in this case, the terminal device monitors the PDCCH within the first time length.

Optionally, the first message is PDCCH, and the first message indicates the first time length by indicating the numerical relationship between the first parameter and the first time length through at least one bit in the first DCI transmitted on the first message, and the terminal device determines the first time length according to the at least one bit and the first parameter.

It should be noted that the first DCI is DCI transmitted on the first message. The first DCI may be DCI containing only the at least one bit, or the at least one bit may be added to common DCI for uplink and downlink scheduling.

For example, a value of the first parameter is 20 ms, and the first message indicates the first time length by indicating the numerical relationship between the first parameter and the first time length through 2 bits in the first DCI transmitted on the first message. As shown in the following table 1, the value 00 of the first DCI indicates that the first time length is 1/4 of the first parameter, i.e., the first time length is 5 ms; the value 01 of the first DCI indicates that the first time length is 1/2 of the first parameter, i.e., the first time length is 10 ms; the value 10 of the first DCI indicates that the first time length is 3/4 of the first parameter, i.e., the first time length is 15 ms; and the value 11 of the first DCI indicates that the first time length is 4/4 of the first parameter, i.e., the first time length is 20 ms.

TABLE 1

| Value of first DCI | 00 | 01 | 10 | 11 |
|---|---|---|---|---|
| Ratio of first time length to first parameter | 1/4 | 1/2 | 3/4 | 1 |
| First time length | 5 ms | 10 ms | 15 ms | 20 ms |

It should be noted that the ratio of first time length to first parameter in the above Table 1 may be configured by the network device or pre-configured.

It should further be noted that the numerical relationship between the first parameter and the first time length in the above Table 1 is only an example. In an implementation of the present disclosure, the first time length may be greater than the first parameter, may be equal to the first parameter, or may be less than the first parameter, which is not restricted in the present disclosure.

Optionally, the first message is an identification sequence, and the first message indicates the first time length by indicating the numerical relationship between the first parameter and the first time length through at least one identification sequence, and the terminal device determines the first time length according to the at least one identification sequence and the first parameter.

For example, a value of the first parameter is 20 ms, and the first message indicates the first time length by indicating the numerical relationship between the first parameter and the first time length through 4 identification sequences. As shown in the following table 2, the identification sequence 1 indicates that the first time length is 1/4 of the first parameter, i.e., the first time length is 5 ms; the identification sequence 2 indicates that the first time length is 1/2 of the first parameter, i.e., the first time length is 10 ms; the identification sequence 3 indicates that the first time length is 3/4 of the first parameter, i.e., the first time length is 15 ms; and the identification sequence 4 indicates that the first time length is 4/4 of the first parameter, i.e., the first time length is 20 ms.

TABLE 2

| Value of identification sequence | 1 | 2 | 3 | 4 |
|---|---|---|---|---|
| Ratio of first time length to first parameter | 1/4 | 1/2 | 3/4 | 1 |
| First time length | 5 ms | 10 ms | 15 ms | 20 ms |

It should be noted that the ratio of first time length to first parameter in the above Table 2 may be configured by the network device or pre-configured.

It should further be noted that the numerical relationship between the first parameter and the first time length in the above Table 2 is only an example. In an implementation of the present disclosure, the first time length may be greater than the first parameter, may be equal to the first parameter, or may be less than the first parameter, which is not restricted in the present disclosure.

Optionally, as an implementation, the first message indicates whether to monitor the PDCCH within the first time length. In this case, the terminal device determines the first time length according to second configuration information and determines whether to monitor the PDCCH within the first time length according to the first message, wherein the second configuration information indicates the first time length.

It should be noted that the second configuration information may be dynamically configured to the terminal device by the network device through RRC signaling, and the second configuration information may also be pre-configured to the terminal device.

For example, when the second configuration information indicates the first time length, the first message may indicate that the PDCCH does not need to be monitored within the first time length, and in this case, the terminal device stops monitoring the PDCCH within the first time length.

For example, when the second configuration information indicates the first time length, the first message may indicate to monitor the PDCCH within the first time length, and in this case, the terminal device monitors the PDCCH within the first time length.

Optionally, the first message is PDCCH, and the first message indicates whether to monitor the PDCCH within the first time length through a first bit in the first DCI transmitted on the first message, wherein when the first bit is 0, it indicates to monitor the PDCCH within the first time length, and when the first bit is 1, it indicates not to monitor the PDCCH within the first time length.

It should be noted that the first DCI is DCI transmitted on the first message. The first DCI may be DCI containing only the first bit, or the first bit may be added to common DCI for uplink and downlink scheduling.

It should be understood that the first bit is a specific bit in the first DCI.

For example, when the first bit is 0, the terminal device determines to monitor the PDCCH within the first time length according to the first bit, or when the first bit is 1, the terminal device determines not to monitor the PDCCH within the first time length according to the first bit.

Optionally, the first message is an identification sequence, and the first message indicates through a first identification sequence to monitor the PDCCH within the first time length, and indicates through a second identification sequence not to monitor the PDCCH within the first time length.

For example, if the first message includes the first identification sequence, the terminal device determines to monitor the PDCCH within the first time length according to the first identification sequence, or if the first message includes the second identification sequence, the terminal device determines not to monitor the PDCCH within the first time length according to the second identification sequence.

Optionally, as an implementation, the first message indicates the first time length and indicates whether to monitor the PDCCH within the first time length. In this case, the terminal device determines the first time length and whether to monitor the PDCCH within the first time length according to the first message.

Specifically, the first message includes first indication information indicating the first time length and second indication information indicating whether to monitor the PDCCH within the first time length, the terminal device determines the first time length according to the first indication information, and determines whether to monitor the PDCCH within the first time length according to the second indication information.

Optionally, the first message is PDCCH and/or an identification sequence.

For example, the first indication information is PDCCH, and the second indication information is an identification sequence.

For another example, the first indication information is an identification sequence, and the second indication information is PDCCH.

For further another example, the first indication information is PDCCH, and the second indication information is PDCCH.

For still further another example, the first indication information is an identification sequence, and the second indication information is an identification sequence.

Optionally, the first indication information is PDCCH, and the first indication information indicates the first time length through at least one bit in the first DCI transmitted on the first message, and the terminal device determines the first time length according to the at least one bit.

For example, four time lengths may be indicated through 2 bits in the first DCI. For example, 00 indicates a time length of 0, 01 indicates a time length of 2 ms or 2 slots, 10 indicates a time length of 4 ms or 4 slots, and 11 indicates a time length of 16 ms or 16 slots.

Optionally, the first indication information is an identification sequence, and the first indication information indicates the first time length through at least one identification sequence, and the terminal device determines the first time length according to the at least one identification sequence.

For example, four time lengths may be indicated through four identification sequences. For example, the identification sequence 1 indicates a time length of 0, the identification sequence 2 indicates a time length of 2 ms or 2 slots, the identification sequence 3 indicates a time length of 4 ms or 4 slots, and the identification sequence 4 indicates a time length of 16 ms or 16 slots.

Optionally, the second indication information is PDCCH, and the second indication information indicates whether to monitor the PDCCH within the first time length through a first bit in the second DCI transmitted on the first message, wherein when the first bit is 0, it indicates to monitor the PDCCH within the first time length, and when the first bit is 1, it indicates not to monitor the PDCCH within the first time length.

For example, if the first bit is 0, the terminal device determines to monitor the PDCCH within the first time length according to the first bit, or if the first bit is 1, the terminal device determines not to monitor the PDCCH within the first time length according to the first bit.

Optionally, the second indication information is an identification sequence, and the second indication information indicates through a first identification sequence to monitor the PDCCH within the first time length, and indicates through a second identification sequence not to monitor the PDCCH within the first time length.

For example, if the first message includes the first identification sequence, the terminal device determines to monitor the PDCCH within the first time length according to the first identification sequence, or if the first message includes the second identification sequence, the terminal device determines not to monitor the PDCCH within the first time length according to the second identification sequence.

It should be noted that when the first message includes the first indication information and the second indication information, the first DCI and the second DCI transmitted on the first message may be the same DCI, the DCI includes the at least one bit indicating the first time length and the first bit indicating whether to monitor the PDCCH within the first time length, and the at least one bit does not include the first bit.

It should further be noted that when the first message includes the first indication information and the second indication information, the at least one identification sequence indicating the first time length is different from the first identification sequence and the second identification sequence indicating whether to monitor the PDCCH within the first time length, that is, the at least one identification sequence does not include the first identification sequence and the second identification sequence.

Optionally, as an implementation, the first message indicates the first time length and indicates whether to monitor the PDCCH within the first time length, wherein the first message indicates the first time length by indicating a numerical relationship between a first parameter and the first time length, and the first parameter is a DRX parameter or a first time parameter. In this case, the terminal device determines the first time length according to the first message and the first parameter, and determines whether to monitor the PDCCH within the first time length according to the first message.

Optionally, the first time parameter is notified by the network device or pre-configured. For example, the network device sends the first time parameter to the terminal device through RRC signaling or Media Access Control Control Element (MAC CE) signaling.

Optionally, if the first parameter is the DRX parameter, the first parameter is one of the following:

a drx-on Duration Timer, a drx-Inactivity Timer, a drx-long cycle, and a drx-short cycle.

Assuming that the first parameter is the drx-on Duration Timer, its value may be as follows:

1 ms, 2 ms, 3 ms, 4 ms, 5 ms, 6 ms, 8 ms, 10 ms, 20 ms, 30 ms, 40 ms, 50 ms, 60 ms, 80 ms, 100 ms, 200 ms, 300 ms, 400 ms, 500 ms, 600 ms, 800 ms, 1000 ms, 1200 ms, 1600 ms.

Assuming that the first parameter is the drx-long cycle, its value may be as follows:

10 ms, 20 ms, 32 ms, 40 ms, 60 ms, 64 ms, 70 ms, 80 ms, 128 ms, 160 ms, 256 ms, 320 ms, 512 ms, 640 ms, 1024 ms, 1280 ms, 2048 ms, 2560 ms, 5120 ms, 10240 ms.

Assuming that the first parameter is the drx-short cycle, its value may be as follows:

2 ms, 3 ms, 4 ms, 5 ms, 6 ms, 7 ms, 8 ms, 10 ms, 14 ms, 16 ms, 20 ms, 30 ms, 32 ms, 35 ms, 40 ms, 64 ms, 80 ms, 128 ms, 256 ms, 320 ms, 512 ms, 640 ms.

The first time parameter may be, for example, 20 ms.

Optionally, if the first parameter is the DRX parameter, the first parameter may be configured by the network device through RRC signaling or a MAC CE.

Specifically, the first message includes first indication information and second indication information, the first indication information indicates the first time length by indicating the numerical relationship between the first parameter and the first time length, and the second indication information indicates whether to monitor the PDCCH within the first time length, the terminal device determines the first time length according to the first indication information and the first parameter, and determines whether to monitor the PDCCH within the first time length according to the second indication information.

Optionally, the first message is PDCCH and/or an identification sequence.

For example, the first indication information is PDCCH, and the second indication information is an identification sequence.

For another example, the first indication information is an identification sequence, and the second indication information is PDCCH.

For further another example, the first indication information is PDCCH, and the second indication information is PDCCH.

For still further another example, the first indication information is an identification sequence, and the second indication information is an identification sequence.

Optionally, the first indication information is PDCCH, and the first indication information indicates the first time length by indicating the numerical relationship between the first parameter and the first time length through at least one bit in the first DCI transmitted on the first message, and the terminal device determines the first time length according to the at least one bit and the first parameter.

For example, a value of the first parameter is 30 ms, and the first message indicates the first time length by indicating the numerical relationship between the first parameter and the first time length through 2 bits in the first DCI transmitted on the first message. As shown in the following table 3, the value 00 of the first DCI indicates that the first time length is 1/5 of the first parameter, i.e., the first time length is 6 ms; the value 01 of the first DCI indicates that the first time length is 2/5 of the first parameter, i.e., the first time length is 12 ms; the value 10 of the first DCI indicates that the first time length is 3/5 of the first parameter, i.e., the first time length is 18 ms; and the value 11 of the first DCI indicates that the first time length is 4/5 of the first parameter, i.e., the first time length is 24 ms.

TABLE 3

| Value of first DCI | 00 | 01 | 10 | 11 |
| --- | --- | --- | --- | --- |
| Ratio of first time length to first parameter | 1/5 | 2/5 | 3/5 | 4/5 |
| First time length | 6 ms | 12 ms | 18 ms | 24 ms |

It should be noted that the ratio of first time length to first parameter in the above Table 3 may be configured by the network device or pre-configured.

It should further be noted that the numerical relationship between the first parameter and the first time length in the above Table 3 is only an example. In an implementation of the present disclosure, the first time length may be greater than the first parameter, may be equal to the first parameter, or may be less than the first parameter, which is not restricted in the present disclosure.

Optionally, the first indication information is an identification sequence, and the first indication information indicates the first time length by indicating the numerical relationship between the first parameter and the first time length through at least one identification sequence, and the terminal device determines the first time length according to the at least one identification sequence and the first parameter.

For example, a value of the first parameter is 32 ms, and the first message indicates the first time length by indicating the numerical relationship between the first parameter and the first time length through 4 identification sequences. As shown in the following table 4, the identification sequence 1 indicates that the first time length is 1/8 of the first parameter, i.e., the first time length is 4 ms; the identification sequence 2 indicates that the first time length is 1/4 of the first parameter, i.e., the first time length is 8 ms; the identification sequence 3 indicates that the first time length is 3/8 of the first parameter, i.e., the first time length is 12 ms; and the identification sequence 4 indicates that the first time length is 1/2 of the first parameter, i.e., the first time length is 16 ms.

TABLE 4

| Value of identification sequence | 1 | 2 | 3 | 4 |
| --- | --- | --- | --- | --- |
| Ratio of first time length to first parameter | 1/8 | 1/4 | 3/8 | 1/2 |
| First time length | 4 ms | 8 ms | 12 ms | 16 ms |

It should be noted that the ratio of first time length to first parameter in the above Table 4 may be configured by the network device or pre-configured.

It should further be noted that the numerical relationship between the first parameter and the first time length in the above Table 4 is only an example. In an implementation of the present disclosure, the first time length may be greater than the first parameter, may be equal to the first parameter, or may be less than the first parameter, which is not restricted in the present disclosure.

Optionally, the second indication information is PDCCH, and the second indication information indicates whether to monitor the PDCCH within the first time length through a first bit in the second DCI transmitted on the first message, wherein when the first bit is 0, it indicates to monitor the PDCCH within the first time length, and when the first bit is 1, it indicates not to monitor the PDCCH within the first time length.

For example, if the first bit is 0, the terminal device determines to monitor the PDCCH within the first time length according to the first bit, or if the first bit is 1, the terminal device determines not to monitor the PDCCH within the first time length according to the first bit.

Optionally, the second indication information is an identification sequence, and the second indication information indicates through a first identification sequence to monitor the PDCCH within the first time length, and indicates through a second identification sequence not to monitor the PDCCH within the first time length.

For example, if the first message includes the first identification sequence, the terminal device determines to monitor the PDCCH within the first time length according to the first identification sequence, or if the first message includes the second identification sequence, the terminal device determines not to monitor the PDCCH within the first time length according to the second identification sequence.

It should be noted that when the first message includes the first indication information and the second indication information, the first DCI and the second DCI transmitted on the first message may be the same DCI, the DCI includes the at least one bit indicating the first time length and the first bit indicating whether to monitor the PDCCH within the first time length, and the at least one bit does not include the first bit.

It should further be noted that when the first message includes the first indication information and the second indication information, the at least one identification sequence indicating the first time length is different from the first identification sequence and the second identification sequence indicating whether to monitor the PDCCH within the first time length, that is, the at least one identification sequence does not include the first identification sequence and the second identification sequence.

Therefore, in the method for monitoring PDCCH according to an implementation of the present disclosure, the terminal device may monitor the PDCCH according to the first message indicating the first time length and/or whether to monitor the PDCCH within the first time length, to avoid power waste caused by continuously monitoring the PDCCH based on the configuration of the PDCCH monitoring window, thereby reducing power consumption when the terminal device monitors the PDCCH.

FIG. 3 is a schematic flowchart of a method 300 for monitoring PDCCH according to an implementation of the present disclosure. The method 300 may optionally be applied to the system shown in FIG. 1, but is not limited thereto. The method 300 includes at least some of the following contents.

In S310, a network device sends a first message to a terminal device, the first message indicates a first time length, and/or indicates whether to monitor the PDCCH within the first time length.

Optionally, the network device may determine the first message according to its own scheduling situation. For example, the network device may determine the first message in combination with service load of the current entire system and length prediction of scheduling queues, or service characteristics of the terminal device, time delay requirements and other factors.

In S320, the network device sends the PDCCH for the terminal device according to the first message.

Optionally, the network device sends periodically the first message to the terminal device.

Optionally, the period in which the network device sends the first message is greater than or equal to that in which the terminal device monitors the PDCCH.

Optionally, if the first message indicates the first time length, the method further includes: the network device sends first configuration information to the terminal device through Radio Resource Control (RRC) signaling, wherein the first configuration information indicates whether to monitor the PDCCH within the first time length. Sending, by the network device, the PDCCH for the terminal device according to the first message includes: the network device determines the first time length according to the first message, and determines whether to send the PDCCH for the terminal device within the first time length according to the first configuration information.

Specifically, if the first message indicates the first time length, the terminal device may determine the first time length according to the first message and determine whether to monitor the PDCCH within the first time length according to the first configuration information. That is, the network device needs to configure the first configuration information for the terminal device additionally. Of course, the first configuration information may be pre-configured on the terminal device side, and in this case, the network device does not need to configure this information for the terminal device additionally.

For example, when the first message indicates the first time length, the first configuration information may indicate not to monitor the PDCCH within the first time length, and in this case, the terminal device stops monitoring the PDCCH in the first time length.

For another example, when the first message indicates the first time length, the first configuration information may indicate to monitor the PDCCH within the first time length, and in this case, the terminal device monitors the PDCCH in the first time length.

Optionally, the first message is PDCCH, and the first message indicates the first time length through at least one bit in first Downlink Control Information (DCI) transmitted on the first message. Determining, by the network device, the first time length according to the first message includes: the network device determines the first time length according to the at least one bit.

It should be noted that the first DCI is DCI transmitted on the first message. The first DCI may be DCI containing only the at least one bit, or the at least one bit may be added to common DCI for uplink and downlink scheduling.

For example, four time lengths may be indicated through 2 bits in the first DCI. For example, 00 indicates a time length of 0, 01 indicates a time length of 2 ms or 2 slots, 10 indicates a time length of 4 ms or 4 slots, and 11 indicates a time length of 16 ms or 16 slots.

Optionally, the first message is an identification sequence, and the first message indicates the first time length through at least one identification sequence. Determining, by the network device, the first time length according to the first message includes: the network device determines the first time length according to the at least one identification sequence.

For example, four time lengths may be indicated through four identification sequences. For example, the identification sequence 1 indicates a time length of 0, the identification sequence 2 indicates a time length of 2 ms or 2 slots, the identification sequence 3 indicates a time length of 4 ms or 4 slots, and the identification sequence 4 indicates a time length of 16 ms or 16 slots.

Optionally, in an implementation of the present disclosure, if the first message indicates the first time length, the first message indicates the first time length by indicating a numerical relationship between a first parameter and the first time length.

Optionally, the first parameter is a Discontinuous Reception (DRX) parameter or a first time parameter.

Optionally, the network device sends first configuration information to the terminal device through Radio Resource Control (RRC) signaling, wherein the first configuration information indicates whether to monitor the PDCCH within the first time length.

Further, the network device determines the first time length according to the first message and the first parameter, and determines whether to send the PDCCH for the terminal device within the first time length according to the first configuration information.

Optionally, if the first parameter is the DRX parameter, the first parameter is one of the following:

a drx-on Duration Timer, a drx-Inactivity Timer, a drx-long cycle, and a drx-short cycle.

Assuming that the first parameter is the drx-on Duration Timer, its value may be as follows:

1 ms, 2 ms, 3 ms, 4 ms, 5 ms, 6 ms, 8 ms, 10 ms, 20 ms, 30 ms, 40 ms, 50 ms, 60 ms, 80 ms, 100 ms, 200 ms, 300 ms, 400 ms, 500 ms, 600 ms, 800 ms, 1000 ms, 1200 ms, 1600 ms.

Assuming that the first parameter is the drx-long cycle, its value may be as follows:

10 ms, 20 ms, 32 ms, 40 ms, 60 ms, 64 ms, 70 ms, 80 ms, 128 ms, 160 ms, 256 ms, 320 ms, 512 ms, 640 ms, 1024 ms, 1280 ms, 2048 ms, 2560 ms, 5120 ms, 10240 ms.

Assuming that the first parameter is the drx-short cycle, its value may be as follows:

2 ms, 3 ms, 4 ms, 5 ms, 6 ms, 7 ms, 8 ms, 10 ms, 14 ms, 16 ms, 20 ms, 30 ms, 32 ms, 35 ms, 40 ms, 64 ms, 80 ms, 128 ms, 256 ms, 320 ms, 512 ms, 640 ms.

The first time parameter may be, for example, 20 ms.

Optionally, in an implementation of the present disclosure, the network device may send the first parameter to the terminal device through RRC signaling or Media Access Control Control Element (MAC CE) signaling.

Optionally, in an implementation of the present disclosure, the network device may send the first time parameter to the terminal device through RRC signaling or MAC CE signaling.

Optionally, in an implementation of the present disclosure, the network device sends the first configuration information to the terminal device through RRC signaling or MAC CE signaling.

For example, when the first message indicates the first time length by indicating the numerical relationship between the first parameter and the first time length, the first configuration information may indicate not to monitor the PDCCH within the first time length, and in this case, the terminal device stops monitoring the PDCCH within the first time length.

For another example, when the first message indicates the first time length by indicating the numerical relationship between the first parameter and the first time length, the first configuration information may indicate to monitor the PDCCH within the first time length, and in this case, the terminal device monitors the PDCCH within the first time length.

Optionally, the first message is PDCCH, and the first message indicates the first time length by indicating the numerical relationship between the first parameter and the first time length through at least one bit in the first DCI transmitted on the first message. Further, the network device determines the first time length according to the at least one bit and the first parameter.

It should be noted that the first DCI is DCI transmitted on the first message. The first DCI may be DCI containing only the at least one bit, or the at least one bit may be added to common DCI for uplink and downlink scheduling.

For example, a value of the first parameter is 20 ms, and the first message indicates the first time length by indicating the numerical relationship between the first parameter and the first time length through 2 bits in the first DCI transmitted on the first message. As shown in the above Table 1, the value 00 of the first DCI indicates that the first time length is 1/4 of the first parameter, i.e., the first time length is 5 ms; the value 01 of the first DCI indicates that the first time length is 1/2 of the first parameter, i.e., the first time length is 10 ms; the value 10 of the first DCI indicates that the first time length is 3/4 of the first parameter, i.e., the first time length is 15 ms; and the value 11 of the first DCI indicates that the first time length is 4/4 of the first parameter, i.e., the first time length is 20 ms.

Optionally, the first message is an identification sequence, and the first message indicates the first time length by indicating the numerical relationship between the first parameter and the first time length through at least one identification sequence. Further, the network device determines the first time length according to the at least one identification sequence and the first parameter.

For example, a value of the first parameter is 20 ms, and the first message indicates the first time length by indicating the numerical relationship between the first parameter and the first time length through 4 identification sequences. As shown in the above Table 2, the identification sequence 1 indicates that the first time length is 1/4 of the first parameter, i.e., the first time length is 5 ms; the identification sequence 2 indicates that the first time length is 1/2 of the first parameter, i.e., the first time length is 10 ms; the identification sequence 3 indicates that the first time length is 3/4 of the first parameter, i.e., the first time length is 15 ms; and the identification sequence 4 indicates that the first time length is 4/4 of the first parameter, i.e., the first time length is 20 ms.

Optionally, if the first message indicates whether to monitor the PDCCH within the first time length, the method further includes: the network device sends second configuration information to the terminal device through RRC signaling, wherein the second configuration information indicates the first time length. Sending, by the network device, the PDCCH for the terminal device according to the first message includes: the network device determines the first time length according to the second configuration information, and determines whether to send the PDCCH for the terminal device within the first time length according to the first message.

Optionally, the first message is PDCCH, and the first message indicates whether to monitor the PDCCH within the first time length through a first bit in the first DCI transmitted on the first message.

When the first bit is 0, it indicates to monitor the PDCCH within the first time length, and when the first bit is 1, it indicates not to monitor the PDCCH within the first time length.

Determining, by the network device, whether to send the PDCCH for the terminal device within the first time length according to the first message includes: if the first bit is 0, the network device determines to send the PDCCH for the terminal device within the first time length according to the first bit, or, if the first bit is 1, the network device determines not to send the PDCCH for the terminal device within the first time length according to the first bit.

Optionally, the first message is an identification sequence, and the first message indicates through a first identification sequence to monitor the PDCCH within the first time length, and indicates through a second identification sequence not to monitor the PDCCH within the first time length.

Determining, by the network device, whether to send the PDCCH for the terminal device within the first time length according to the first message includes: if the first message includes the first identification sequence, the network device determines to send the PDCCH for the terminal device within the first time length according to the first identification sequence, or, if the first message includes the second identification sequence, the network device determines not to send the PDCCH for the terminal device within the first time length according to the second identification sequence.

Optionally, if the first message indicates the first time length and indicates whether to monitor the PDCCH within the first time length, sending, by the network device, the PDCCH for the terminal device according to the first message includes: the network device determines the first time length and whether to send the PDCCH for the terminal device within the first time length according to the first message.

Optionally, the first message includes first indication information indicating the first time length and second indication information indicating whether to monitor the PDCCH within the first time length. Determining, by the network device, the first time length and whether to send the PDCCH for the terminal device within the first time length according to the first message includes: the network device determines the first time length according to the first indication information, and determines whether to send the PDCCH for the terminal device within the first time length according to the second indication information.

Optionally, the first message is PDCCH and/or an identification sequence.

Optionally, the first indication information indicates the first time length through at least one bit in the first DCI transmitted on the first message. Determining, by the network device, the first time length according to the first indication information includes: the network device determines the first time length according to the at least one bit.

Optionally, the first indication information indicates the first time length through at least one identification sequence. Determining, by the network device, the first time length according to the first indication information includes: the network device determines the first time length according to the at least one identification sequence.

Optionally, the second indication information indicates whether to monitor the PDCCH within the first time length through a first bit in the second DCI transmitted on the first message, wherein when the first bit is 0, it indicates to monitor the PDCCH within the first time length, and when the first bit is 1, it indicates not to monitor the PDCCH within the first time length. Determining, by the network device, whether to send the PDCCH for the terminal device within the first time length according to the second indication information includes: if the first bit is 0, the network device determines to send the PDCCH for the terminal device within the first time length according to the first bit, or, if the first bit is 1, the network device determines not to send the PDCCH for the terminal device within the first time length according to the first bit.

Optionally, the second indication information indicates through a first identification sequence to monitor the PDCCH within the first time length, and indicates through a second identification sequence not to monitor the PDCCH within the first time length. Determining, by the network device, whether to send the PDCCH for the terminal device within the first time length according to the second indication information includes: if the first message includes the first identification sequence, the network device determines to send the PDCCH for the terminal device within the first time length according to the first identification sequence, or, if the first message includes the second identification sequence, the network device determines not to send the PDCCH for the terminal device within the first time length according to the second identification sequence.

Optionally, in an implementation of the present disclosure, the first message indicates the first time length and indicates whether to monitor the PDCCH within the first time length, wherein the first message indicates the first time length by indicating a numerical relationship between a first parameter and the first time length, and the first parameter is a DRX parameter or a first time parameter. Further, the network device determines the first time length according to the first message and the first parameter, and determines whether to send the PDCCH for the terminal device within the first time length according to the first message.

Optionally, if the first parameter is the DRX parameter, the first parameter is one of the following:

a drx-on Duration Timer, a drx-Inactivity Timer, a drx-long cycle, and a drx-short cycle.

Assuming that the first parameter is the drx-on Duration Timer, its value may be as follows:

1 ms, 2 ms, 3 ms, 4 ms, 5 ms, 6 ms, 8 ms, 10 ms, 20 ms, 30 ms, 40 ms, 50 ms, 60 ms, 80 ms, 100 ms, 200 ms, 300 ms, 400 ms, 500 ms, 600 ms, 800 ms, 1000 ms, 1200 ms, 1600 ms.

Assuming that the first parameter is the drx-long cycle, its value may be as follows:

10 ms, 20 ms, 32 ms, 40 ms, 60 ms, 64 ms, 70 ms, 80 ms, 128 ms, 160 ms, 256 ms, 320 ms, 512 ms, 640 ms, 1024 ms, 1280 ms, 2048 ms, 2560 ms, 5120 ms, 10240 ms.

Assuming that the first parameter is the drx-short cycle, its value may be as follows:

2 ms, 3 ms, 4 ms, 5 ms, 6 ms, 7 ms, 8 ms, 10 ms, 14 ms, 16 ms, 20 ms, 30 ms, 32 ms, 35 ms, 40 ms, 64 ms, 80 ms, 128 ms, 256 ms, 320 ms, 512 ms, 640 ms.

The first time parameter may be, for example, 20 ms.

Optionally, the network device sends the first parameter to the terminal device through RRC signaling or Media Access Control Control Element (MAC CE) signaling.

Optionally, the network device sends the first time parameter to the terminal device through RRC signaling or MAC CE signaling.

Specifically, the first message includes first indication information and second indication information, wherein the first indication information indicates the first time length by indicating the numerical relationship between the first parameter and the first time length, and the second indication information indicates whether to monitor the PDCCH within the first time length. Further, the network device determines the first time length according to the first indication information and the first parameter, and determines whether to send the PDCCH for the terminal device within the first time length according to the second indication information.

Optionally, the first message is PDCCH and/or an identification sequence.

Optionally, the first indication information indicates the first time length by indicating the numerical relationship between the first parameter and the first time length through at least one bit in the first DCI transmitted on the first message. Further, the network device determines the first time length according to the at least one bit and the first parameter.

For example, a value of the first parameter is 30 ms, and the first message indicates the first time length by indicating the numerical relationship between the first parameter and the first time length through 2 bits in the first DCI transmitted on the first message. As shown in the above Table 3, the value 00 of the first DCI indicates that the first time length is 1/5 of the first parameter, i.e., the first time length is 6 ms; the value 01 of the first DCI indicates that the first time length is 2/5 of the first parameter, i.e., the first time length is 12 ms; the value 10 of the first DCI indicates that the first time length is 3/5 of the first parameter, i.e., the first time length is 18 ms; and the value 11 of the first DCI indicates that the first time length is 4/5 of the first parameter, i.e., the first time length is 24 ms.

Optionally, the first indication information indicates the first time length by indicating the numerical relationship between the first parameter and the first time length through at least one identification sequence. Further, the network device determines the first time length according to the at least one identification sequence and the first parameter.

For example, a value of the first parameter is 32 ms, and the first message indicates the first time length by indicating the numerical relationship between the first parameter and the first time length through 4 identification sequences. As shown in the above Table 4, the identification sequence 1 indicates that the first time length is 1/8 of the first parameter, i.e., the first time length is 4 ms; the identification sequence 2 indicates that the first time length is 1/4 of the first parameter, i.e., the first time length is 8 ms; the identification sequence 3 indicates that the first time length is 3/8 of the first parameter, i.e., the first time length is 12 ms;

and the identification sequence 4 indicates that the first time length is 1/2 of the first parameter, i.e., the first time length is 16 ms.

Optionally, the second indication information indicates whether to monitor the PDCCH within the first time length through a first bit in the second DCI transmitted on the first message, wherein when the first bit is 0, it indicates to monitor the PDCCH within the first time length, and when the first bit is 1, it indicates not to monitor the PDCCH within the first time length.

For example, if the first bit is 0, the network device determines to send the PDCCH for the terminal device within the first time length according to the first bit.

For another example, if the first bit is 1, the network device determines not to send the PDCCH for the terminal device within the first time length according to the first bit.

Optionally, the second indication information indicates through a first identification sequence to monitor the PDCCH within the first time length, and indicates through a second identification sequence not to monitor the PDCCH within the first time length.

For example, if the first message includes the first identification sequence, the network device determines to send the PDCCH for the terminal device within the first time length according to the first identification sequence.

For another example, if the first message includes the second identification sequence, the network device determines not to send the PDCCH for the terminal device within the first time length according to the second identification sequence.

Optionally, a unit of the first time length is a time slot or a millisecond.

Optionally, if the unit of the first time length is the time slot, the first message includes third indication information indicating a subcarrier spacing corresponding to the first time length or indicating that the subcarrier spacing corresponding to the first time length is consistent with the subcarrier spacing corresponding to the PDCCH.

Optionally, the terminal device is in an RRC connection state.

As an example, as shown in FIG. 4, the network device may make judgment to some extent on whether the terminal device will be scheduled in a future time length according to its own scheduling situation. For example, based on the service load of the current entire system and the length prediction of scheduling queues, e.g., the busy current system and very long scheduling queues, the network device predicts that the currently scheduled terminal device will not be scheduled within a future time length X. The network device may send a first message (the first message is PDCCH) to the terminal device, the first message contains DCI of current scheduling, and the DCI of current scheduling carries information indicating the time length X, and an indication that the PDCCH does not need to be monitored within the time length X. After receiving the first message, the terminal device no longer detects the PDCCH related to data transmission within the time length X from the start of the first message.

Preferably, the terminal device may no longer detect the PDCCH related to data transmission within the time length X after the data transmission scheduled by the current DCI is completed and the related ACK feedback is received, thereby ensuring that the PDCCH will not be monitored until the data scheduled by the current DCI is correctly transmitted, so as to avoid missing the PDCCH for scheduling data retransmission.

For example, the network device may make judgment according to its own scheduling situation, for example, in combination with service load of the current entire system and length prediction of the scheduling queues, or service characteristics of the terminal device, time delay requirements or other factors, to, for example, indicate the terminal device to monitor the PDCCH normally within a time length N according to existing PDCCH configuration information (e.g., Physical Downlink Control Channel Control Resource Set (PDCCH CORESET), configuration of the PDCCH search space) and/or configuration information of the DRX.

It should be understood that the acts in the method 300 for monitoring PDCCH may refer to the corresponding acts in the method 200 for monitoring PDCCH. Specifically, the related description of the first message, the first parameter, the first configuration information, the second configuration information, and the first time length may refer to the description in the method 200 for monitoring PDCCH, which will not be repeated here for the sake of brevity.

Therefore, in the method for monitoring PDCCH according to an implementation of the present disclosure, the network device may send the PDCCH for the terminal device according to the first message indicating the first time length and/or whether to monitor the PDCCH within the first time length, to avoid power waste caused by continuously monitoring the PDCCH based on the configuration of the PDCCH monitoring window by the terminal device, thereby reducing power consumption when the terminal device monitors the PDCCH.

Figure 5:
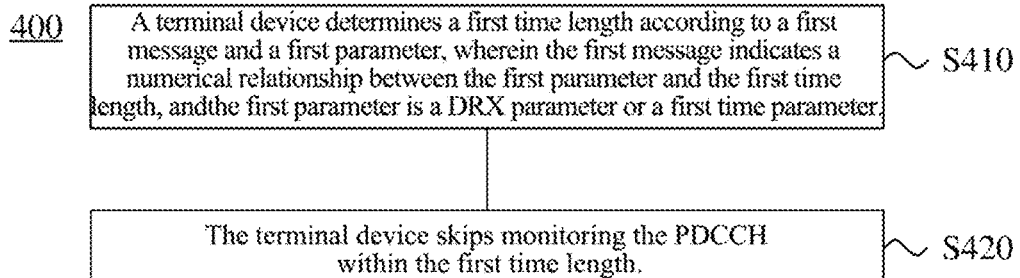
FIG. 5 is a schematic flowchart of a further another method for monitoring PDCCH according to an implementation of the present disclosure.

FIG. 5 is a schematic flowchart of a method 400 for monitoring PDCCH according to an implementation of the present disclosure. The method 400 may optionally be applied to the system shown in FIG. 1, but is not limited thereto. The method 400 includes at least some of the following contents.

In S410, a terminal device determines a first time length according to a first message and a first parameter, wherein the first message indicates a numerical relationship between the first parameter and the first time length, and the first parameter is a Discontinuous Reception (DRX) parameter or a first time parameter.

In S420, the terminal device skips monitoring the PDCCH within the first time length.

Optionally, in an implementation of the present disclosure, if the first parameter is the DRX parameter, the first parameter is one of the following:

a drx-on Duration Timer, a drx-Inactivity Timer, a drx-long cycle, and a drx-short cycle.

Assuming that the first parameter is the drx-on Duration Timer, its value may be as follows:

1 ms, 2 ms, 3 ms, 4 ms, 5 ms, 6 ms, 8 ms, 10 ms, 20 ms, 30 ms, 40 ms, 50 ms, 60 ms, 80 ms, 100 ms, 200 ms, 300 ms, 400 ms, 500 ms, 600 ms, 800 ms, 1000 ms, 1200 ms, 1600 ms.

Assuming that the first parameter is the drx-long cycle, its value may be as follows:

10 ms, 20 ms, 32 ms, 40 ms, 60 ms, 64 ms, 70 ms, 80 ms, 128 ms, 160 ms, 256 ms, 320 ms, 512 ms, 640 ms, 1024 ms, 1280 ms, 2048 ms, 2560 ms, 5120 ms, 10240 ms.

Assuming that the first parameter is the drx-short cycle, its value may be as follows:

2 ms, 3 ms, 4 ms, 5 ms, 6 ms, 7 ms, 8 ms, 10 ms, 14 ms, 16 ms, 20 ms, 30 ms, 32 ms, 35 ms, 40 ms, 64 ms, 80 ms, 128 ms, 256 ms, 320 ms, 512 ms, 640 ms.

The first time parameter may be, for example, 20 ms.

Optionally, if the first parameter is the DRX parameter, the first parameter may be configured by the network device through Radio Resource Control (RRC) signaling or a Media Access Control Control Element (MAC CE).

Optionally, the first time parameter is notified by the network device or pre-configured. For example, the network device sends the first time parameter to the terminal device through RRC signaling or MAC CE signaling.

Optionally, in an implementation of the present disclosure, the terminal device receives the first message sent by the network device.

Optionally, the terminal device receives periodically the first message sent by the network device. In other words, the network device sends periodically the first message to the terminal device.

Optionally, the period in which the terminal device receives the first message is greater than or equal to that in which the terminal device monitors the PDCCH. Thus, the first message in one period may be used for indicating PDCCH monitoring behavior in at least one PDCCH period. It should be understood that the period in which the terminal device monitors the PDCCH is configured, for example, the period in which the terminal device monitors the PDCCH is the period of the PDCCH search space which may be semi-statically configured by the network device to the terminal device.

It should further be understood that the terminal device may continuously monitor the PDCCH based on configuration of the PDCCH monitoring window in a time length other than the first time length, for example, the terminal device may monitor the PDCCH based on configuration information of the PDCCH and/or configuration information of Discontinuous Reception (DRX).

Optionally, the first message is PDCCH, and the first message indicates the numerical relationship between the first parameter and the first time length through at least one bit in the first DCI transmitted on the first message. Further, the terminal device determines the first time length according to the at least one bit and the first parameter.

It should be noted that the first DCI is DCI transmitted on the first message. The first DCI may be DCI containing only the at least one bit, or the at least one bit may be added to common DCI for uplink and downlink scheduling.

For example, a value of the first parameter is 128 ms, and the first message indicates the first time length by indicating the numerical relationship between the first parameter and the first time length through 2 bits in the first DCI transmitted on the first message. As shown in the following table 5, the value 00 of the first DCI indicates that the first time length is 1/4 of the first parameter, i.e., the first time length is 32 ms; the value 01 of the first DCI indicates that the first time length is 1/2 of the first parameter, i.e., the first time length is 64 ms; the value 10 of the first DCI indicates that the first time length is 3/4 of the first parameter, i.e., the first time length is 96 ms; and the value 11 of the first DCI indicates that the first time length is 4/4 of the first parameter, i.e., the first time length is 128 ms.

TABLE 5

| Value of first DCI | 00 | 01 | 10 | 11 |
|---|---|---|---|---|
| Ratio of first time length to first parameter | 1/4 | 1/2 | 3/4 | 1 |
| First time length | 32 ms | 64 ms | 96 ms | 128 ms |

It should be noted that the ratio of first time length to first parameter in the above Table 5 may be configured by the network device or pre-configured.

It should further be noted that the numerical relationship between the first parameter and the first time length in the above Table 5 is only an example. In an implementation of the present disclosure, the first time length may be greater than the first parameter, may be equal to the first parameter, or may be less than the first parameter, which is not restricted in the present disclosure.

Optionally, the first message is an identification sequence, and the first message indicates the numerical relationship between the first parameter and the first time length through at least one identification sequence. Further, the terminal device determines the first time length according to the at least one identification sequence and the first parameter.

For example, a value of the first parameter is 35 ms, and the first message indicates the first time length by indicating the numerical relationship between the first parameter and the first time length through 5 identification sequences. As shown in the following table 6, the identification sequence 1 indicates that the first time length is 1/5 of the first parameter, i.e., the first time length is 7 ms; the identification sequence 2 indicates that the first time length is 2/5 of the first parameter, i.e., the first time length is 14 ms; the identification sequence 3 indicates that the first time length is 3/5 of the first parameter, i.e., the first time length is 21 ms; the identification sequence 4 indicates that the first time length is 4/5 of the first parameter, i.e., the first time length is 28 ms; and the identification sequence 5 indicates that the first time length is 5/5 of the first parameter, i.e., the first time length is 35 ms.

TABLE 6

| Value of identification sequence | 1 | 2 | 3 | 4 | 5 |
|---|---|---|---|---|---|
| Ratio of first time length to first parameter | 1/5 | 2/5 | 3/5 | 4/5 | 1 |
| First time length | 7 ms | 14 ms | 21 ms | 28 ms | 35 ms |

It should be noted that the ratio of first time length to first parameter in the above Table 6 may be configured by the network device or pre-configured.

It should further be noted that the numerical relationship between the first parameter and the first time length in the above Table 6 is only an example. In an implementation of the present disclosure, the first time length may be greater than the first parameter, may be equal to the first parameter, or may be less than the first parameter, which is not restricted in the present disclosure.

Optionally, a unit of the first time length is a time slot or a millisecond.

Optionally, if the unit of the first time length is the time slot, the first message includes first indication information, the first indication information indicates a subcarrier spacing corresponding to the first time length or indicates that the subcarrier spacing corresponding to the first time length is consistent with the subcarrier spacing corresponding to the PDCCH.

Optionally, in an implementation of the present disclosure, the terminal device is in an RRC connection state.

Therefore, in the method for monitoring PDCCH according to an implementation of the present disclosure, the terminal device may determine the first time length according to the first message and the first parameter, and skip monitoring the PDCCH within the first time length, to avoid power waste caused by continuously monitoring the PDCCH based on the configuration of the PDCCH monitoring window, thereby reducing power consumption when the terminal device monitors the PDCCH.

Figure 6:
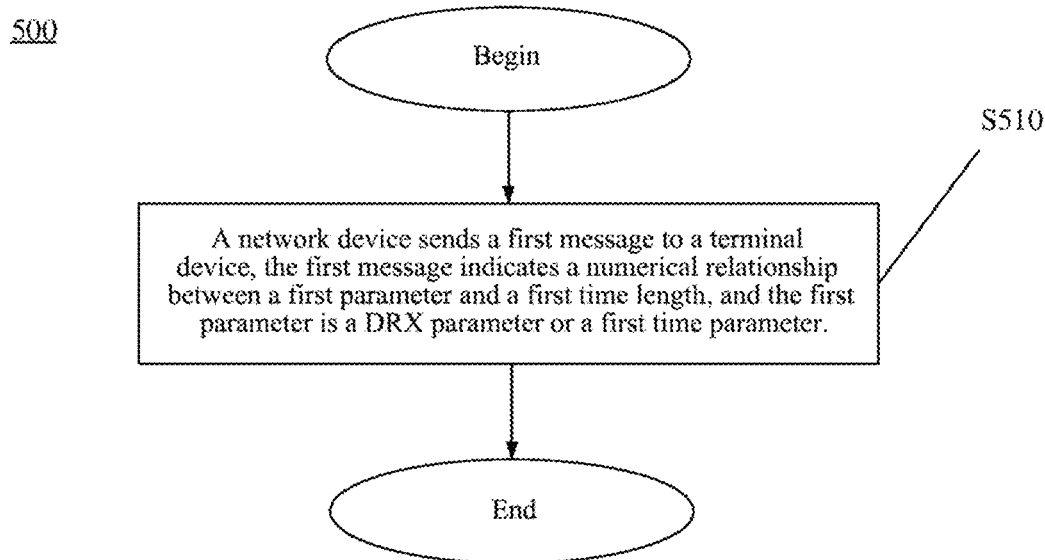
FIG. 6 is a schematic flowchart of a still further another method for monitoring PDCCH according to an implementation of the present disclosure.

FIG. 6 is a schematic flowchart of a method 500 for monitoring PDCCH according to an implementation of the present disclosure. The method 500 may optionally be applied to the system shown in FIG. 1, but is not limited thereto. The method 500 includes at least some of the following contents.

In S510, a network device sends a first message to a terminal device, the first message indicates a numerical relationship between a first parameter and a first time length, and the first parameter is a discontinuous reception (DRX) parameter or a first time parameter.

It should be noted that after receiving the first message, the terminal device may determine the first time length according to the first message and the first parameter and monitor the PDCCH within the first time length.

Optionally, in an implementation of the present disclosure, if the first parameter is the DRX parameter, the first parameter is one of the following:

a drx-on Duration Timer, a drx-Inactivity Timer, a drx-long cycle, and a drx-short cycle.

Assuming that the first parameter is the drx-on Duration Timer, its value may be as follows:

1 ms, 2 ms, 3 ms, 4 ms, 5 ms, 6 ms, 8 ms, 10 ms, 20 ms, 30 ms, 40 ms, 50 ms, 60 ms, 80 ms, 100 ms, 200 ms, 300 ms, 400 ms, 500 ms, 600 ms, 800 ms, 1000 ms, 1200 ms, 1600 ms.

Assuming that the first parameter is the drx-long cycle, its value may be as follows:

10 ms, 20 ms, 32 ms, 40 ms, 60 ms, 64 ms, 70 ms, 80 ms, 128 ms, 160 ms, 256 ms, 320 ms, 512 ms, 640 ms, 1024 ms, 1280 ms, 2048 ms, 2560 ms, 5120 ms, 10240 ms.

Assuming that the first parameter is the drx-short cycle, its value may be as follows:

2 ms, 3 ms, 4 ms, 5 ms, 6 ms, 7 ms, 8 ms, 10 ms, 14 ms, 16 ms, 20 ms, 30 ms, 32 ms, 35 ms, 40 ms, 64 ms, 80 ms, 128 ms, 256 ms, 320 ms, 512 ms, 640 ms.

The first time parameter may be, for example, 20 ms.

Optionally, in an implementation of the present disclosure, the network device sends the first parameter to the terminal device through Radio Resource Control (RRC) signaling or a Media Access Control Control Element (MAC CE).

Optionally, in an implementation of the present disclosure, the network device sends the first time parameter to the terminal device through RRC signaling or MAC CE signaling.

Specifically, the network device sends periodically the first message to the terminal device.

Optionally, the period in which the network device sends the first message is greater than or equal to that in which the terminal device monitors the PDCCH.

It should be noted that the period in which the network device sends the first message is greater than or equal to that in which the terminal device monitors the PDCCH. Thus, the first message in one period may be used for indicating a PDCCH monitoring behavior in at least one PDCCH period. It should be understood that the period in which the terminal device monitors the PDCCH is configured, for example, the period in which the terminal device monitors the PDCCH is the period of the PDCCH search space which may be semi-statically configured by the network device to the terminal device.

Optionally, the first message is PDCCH, and the first message indicates the numerical relationship between the first parameter and the first time length through at least one bit in the first DCI transmitted on the first message.

It should be noted that the first DCI is DCI transmitted on the first message. The first DCI may be DCI containing only the at least one bit, or the at least one bit may be added to common DCI for uplink and downlink scheduling.

For example, a value of the first parameter is 128 ms, and the first message indicates the first time length by indicating the numerical relationship between the first parameter and the first time length through 2 bits in the first DCI transmitted on the first message. As shown in the above Table 5, the value 00 of the first DCI indicates that the first time length is 1/4 of the first parameter, i.e., the first time length is 32 ms; the value 01 of the first DCI indicates that the first time length is 1/2 of the first parameter, i.e., the first time length is 64 ms; the value 10 of the first DCI indicates that the first time length is 3/4 of the first parameter, i.e., the first time length is 96 ms; and the value 11 of the first DCI indicates that the first time length is 4/4 of the first parameter, i.e., the first time length is 128 ms.

Optionally, the first message is an identification sequence, and the first message indicates the numerical relationship between the first parameter and the first time length through at least one identification sequence.

For example, a value of the first parameter is 35 ms, and the first message indicates the first time length by indicating the numerical relationship between the first parameter and the first time length through 5 identification sequences. As shown in the above Table 6, the identification sequence 1 indicates that the first time length is 1/5 of the first parameter, i.e., the first time length is 7 ms; the identification sequence 2 indicates that the first time length is 2/5 of the first parameter, i.e., the first time length is 14 ms; the identification sequence 3 indicates that the first time length is 3/5 of the first parameter, i.e., the first time length is 21 ms; the identification sequence 4 indicates that the first time length is 4/5 of the first parameter, i.e., the first time length is 28 ms; and the identification sequence 5 indicates that the first time length is 5/5 of the first parameter, i.e., the first time length is 35 ms.

Optionally, a unit of the first time length is a time slot or a millisecond.

Optionally, if the unit of the first time length is the time slot, the first message includes first indication information, the first indication information indicates a subcarrier spacing corresponding to the first time length, or indicates that the subcarrier spacing corresponding to the first time length is consistent with the subcarrier spacing corresponding to the PDCCH.

Optionally, in an implementation of the present disclosure, the terminal device is in an RRC connection state.

It should be understood that the acts in the method 500 for monitoring PDCCH may refer to the corresponding acts in the method 400 for monitoring PDCCH. Specifically, the related description of the first message, the first parameter, and the first time length may refer to the description in the method 400 for monitoring PDCCH, which will not be repeated here for the sake of brevity.

Therefore, in the method for monitoring PDCCH according to an implementation of the present disclosure, the network device may send the first message to the terminal device, so that the terminal device determines the first time length according to the first message and the first parameter, and skips monitoring the PDCCH within the first time length, to avoid power waste caused by continuously monitoring the PDCCH based on the configuration of the PDCCH monitoring window, thereby reducing power consumption when the terminal device monitors the PDCCH.

Figure 7:
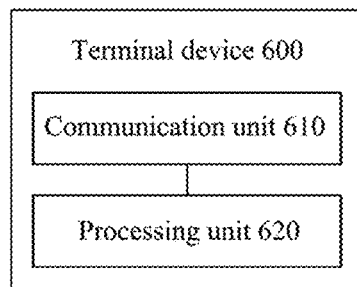
FIG. 7 is a schematic block diagram of a terminal device according to an implementation of the present disclosure.

FIG. 7 is a schematic block diagram of a terminal device 600 according to an implementation of the present disclosure. The terminal device 600 includes a communication unit 610 and a processing unit 620.

The communication unit 610 is configured to receive a first message sent by a network device, the first message indicating a first time length, and/or indicating whether to monitor the PDCCH within the first time length.

The processing unit 620 is configured to monitor the PDCCH according to the first message.

Optionally, the communication unit 610 is specifically configured to receive periodically the first message sent by the network device.

Optionally, the period in which the terminal device 600 receives the first message is greater than or equal to that in which the terminal device 600 monitors the PDCCH.

Optionally, if the first message indicates the first time length, the processing unit 620 is specifically configured to determine the first time length according to the first message and determine whether to monitor the PDCCH within the first time length according to first configuration information, wherein the first configuration information indicates whether to monitor the PDCCH within the first time length.

Optionally, before the processing unit 620 determines the first time length according to the first message and determines whether to monitor the PDCCH within the first time length according to the first configuration information, the communication unit 610 is further configured to receive the first configuration information sent by the network device through Radio Resource Control (RRC) signaling.

Optionally, the first configuration information is pre-configured to the terminal device 600.

Optionally, the first message is PDCCH, and the first message indicates the first time length through at least one bit in the first DCI transmitted on the first message.

The processing unit 620 is specifically configured to determine the first time length according to the at least one bit.

Optionally, the first message is an identification sequence, and the first message indicates the first time length through at least one identification sequence.

The processing unit 620 is specifically configured to determine the first time length according to the at least one identification sequence.

Optionally, if the first message indicates the first time length, the first message indicates the first time length by indicating a numerical relationship between a first parameter and the first time length, wherein the first parameter is a Discontinuous Reception (DRX) parameter or a first time parameter.

The processing unit 620 is specifically configured to determine the first time length according to the first message and the first parameter, and determine whether to monitor the PDCCH within the first time length according to first configuration information, wherein the first configuration information indicates whether to monitor the PDCCH within the first time length.

Optionally, if the first parameter is the DRX parameter, the first parameter is one of the following:

a DRX-on duration timer, a DRX-inactivity timer, a DRX-long cycle, and a DRX-short cycle.

Optionally, the communication unit 610 is further configured to receive the first parameter sent by the network device through Radio Resource Control (RRC) signaling or Media Access Control Control Element (MAC CE) signaling.

Optionally, the first time parameter is notified by the network device or pre-configured.

Optionally, the communication unit 610 is further configured to receive the first configuration information sent by the network device through RRC signaling or MAC CE signaling.

Optionally, the first configuration information is pre-configured to the terminal device.

Optionally, the first message is PDCCH, and the first message indicates the first time length by indicating the numerical relationship between the first parameter and the first time length through at least one bit in first DCI transmitted on the first message.

The processing unit 620 is specifically configured to determine the first time length according to the at least one bit and the first parameter.

Optionally, the first message is an identification sequence, and the first message indicates the first time length by indicating the numerical relationship between the first parameter and the first time length through at least one identification sequence.

The processing unit 620 is specifically configured to determine the first time length according to the at least one identification sequence and the first parameter.

Optionally, if the first message indicates whether to monitor the PDCCH within the first time length, the processing unit 620 is specifically configured to determine the first time length according to second configuration information and determine whether to monitor the PDCCH within the first time length according to the first message, wherein the second configuration information indicates the first time length.

Optionally, before the processing unit 620 determines the first time length according to the second configuration information and determines whether to monitor the PDCCH within the first time length according to the first message, the communication unit 610 is further configured to receive the second configuration information sent by the network device through RRC signaling.

Optionally, the second configuration information is pre-configured to the terminal device 600.

Optionally, the first message is PDCCH, and the first message indicates whether to monitor the PDCCH within the first time length through a first bit in first DCI transmitted on the first message. Wherein when the first bit is 0, it indicates to monitor the PDCCH within the first time length, and when the first bit is 1, it indicates not to monitor the PDCCH within the first time length.

The processing unit 620 is specifically configured to, if the first bit is 0, determine to monitor the PDCCH within the first time length according to the first bit, or, if the first bit is 1, determine not to monitor the PDCCH within the first time length according to the first bit.

Optionally, the first message is an identification sequence, and the first message indicates through a first identification sequence to monitor the PDCCH within the first time length, and indicates through a second identification sequence not to monitor the PDCCH within the first time length.

The processing unit 620 is specifically configured to, if the first message includes the first identification sequence, determine to monitor the PDCCH within the first time length according to the first identification sequence, or, if the first message includes the second identification sequence, determine not to monitor the PDCCH within the first time length according to the second identification sequence.

Optionally, if the first message indicates the first time length and indicates whether to monitor the PDCCH within the first time length, the processing unit 620 is specifically configured to determine the first time length and whether to monitor the PDCCH within the first time length according to the first message.

Optionally, the first message includes first indication information indicating the first time length and second indication information indicating whether to monitor the PDCCH within the first time length; and the processing unit 620 is specifically configured to determine the first time length according to the first indication information, and determine whether to monitor the PDCCH within the first time length according to the second indication information.

Optionally, the first message is PDCCH and/or an identification sequence.

Optionally, the first indication information indicates the first time length through at least one bit in the first DCI transmitted on the first message. The processing unit 620 is specifically configured to determine the first time length according to the at least one bit.

Optionally, the first indication information indicates the first time length through at least one identification sequence. The processing unit 620 is specifically configured to determine the first time length according to the at least one identification sequence.

Optionally, the second indication information indicates whether to monitor the PDCCH within the first time length through a first bit in second DCI transmitted on the first message, wherein when the first bit is 0, it indicates to monitor the PDCCH within the first time length, and when the first bit is 1, it indicates not to monitor the PDCCH within the first time length. The processing unit 620 is specifically configured to, if the first bit is 0, determine to monitor the PDCCH within the first time length according to the first bit, or, if the first bit is 1, determine not to monitor the PDCCH within the first time length according to the first bit.

Optionally, the second indication information indicates through a first identification sequence to monitor the PDCCH within the first time length, and indicates through a second identification sequence not to monitor the PDCCH within the first time length. The processing unit 620 is specifically configured to, if the first message includes the first identification sequence, determine to monitor the PDCCH within the first time length according to the first identification sequence, or, if the first message includes the second identification sequence, determine not to monitor the PDCCH within the first time length according to the second identification sequence.

Optionally, if the first message indicates the first time length and indicates whether to monitor the PDCCH within the first time length, wherein the first message indicates the first time length by indicating a numerical relationship between a first parameter and the first time length, and the first parameter is a DRX parameter or a first time parameter. The processing unit 620 is specifically configured to determine the first time length according to the first message and the first parameter, and determine whether to monitor the PDCCH within the first time length according to the first message.

Optionally, if the first parameter is the DRX parameter, the first parameter is one of the following:

a DRX-on duration timer, a DRX-inactivity timer, a DRX-long cycle, and a DRX-short cycle.

Optionally, the communication unit 610 is further configured to receive the first parameter sent by the network device through RRC signaling or MAC CE signaling.

Optionally, the first time parameter is notified by the network device or pre-configured.

Optionally, the first message includes first indication information and second indication information, wherein the first indication information indicates the first time length by indicating the numerical relationship between the first parameter and the first time length, and the second indication information indicates whether to monitor the PDCCH within the first time length.

The processing unit 620 is specifically configured to determine the first time length according to the first indication information and the first parameter, and determine whether to monitor the PDCCH within the first time length according to the second indication information.

Optionally, the first message is PDCCH and/or an identification sequence.

Optionally, the first indication information indicates the first time length by indicating the numerical relationship between the first parameter and the first time length through at least one bit in the first DCI transmitted on the first message.

The processing unit 620 is specifically configured to determine the first time length according to the at least one bit and the first parameter.

Optionally, the first indication information indicates the first time length by indicating the numerical relationship between the first parameter and the first time length through at least one identification sequence.

The processing unit 620 is specifically configured to determine the first time length according to the at least one identification sequence and the first parameter.

Optionally, the second indication information indicates whether to monitor the PDCCH within the first time length through a first bit in the second DCI transmitted on the first message, wherein when the first bit is 0, it indicates to monitor the PDCCH within the first time length, and when the first bit is 1, it indicates not to monitor the PDCCH within the first time length.

The processing unit 620 is specifically configured to, if the first bit is 0, determine to monitor the PDCCH within the first time length according to the first bit, or, if the first bit is 1, determine not to monitor the PDCCH within the first time length according to the first bit.

Optionally, the second indication information indicates through a first identification sequence to monitor the PDCCH within the first time length, and indicates through a second identification sequence not to monitor the PDCCH within the first time length.

The processing unit 620 is specifically configured to, if the first message includes the first identification sequence, determine to monitor the PDCCH within the first time length according to the first identification sequence, or, if the first message includes the second identification sequence, determine not to monitor the PDCCH within the first time length according to the second identification sequence.

Optionally, a unit of the first time length is a time slot or a millisecond.

Optionally, if the unit of the first time length is the time slot, the first message includes third indication information indicating a subcarrier spacing corresponding to the first time length or indicating that the subcarrier spacing corresponding to the first time length is consistent with the subcarrier spacing corresponding to the PDCCH.

Optionally, the terminal device is in an RRC connection state.

It should be understood that the terminal device 600 may correspond to the terminal device in the method 200, and may implement corresponding operations implemented by the terminal device in the method 200. For the sake of brevity, those will not be repeated here.

Figure 8:
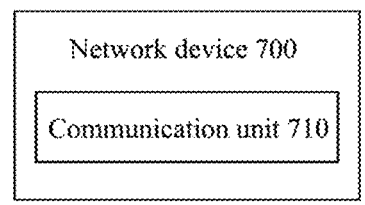
FIG. 8 is a schematic block diagram of a network device according to an implementation of the present disclosure.

FIG. 8 is a schematic block diagram of a network device 700 according to an implementation of the present disclosure. The network device 700 includes a communication unit 710.

The communication unit 710 is configured to send a first message to a terminal device, the first message indicating a first time length, and/or whether to monitor a PDCCH within the first time length.

The communication unit 710 is further configured to send the PDCCH for the terminal device according to the first message.

Optionally, the communication unit 710 is specifically configured to send periodically the first message to the terminal device.

Optionally, the period in which the network device 700 sends the first message is greater than or equal to that in which the terminal device monitors the PDCCH.

Optionally, if the first message indicates the first time length, the communication unit 710 is further configured to send first configuration information to the terminal device through RRC signaling, the first configuration information indicates whether to monitor the PDCCH within the first time length.

The network device 700 further includes a processing unit 720, configured to determine the first time length according to the first message, and determine whether to send the PDCCH for the terminal device within the first time length according to the first configuration information.

Optionally, the first message is PDCCH, and the first message indicates the first time length through at least one bit in first Downlink Control Information (DCI) transmitted on the first message.

The processing unit 720 is specifically configured to determine the first time length according to the at least one bit.

Optionally, the first message is an identification sequence, and the first message indicates the first time length through at least one identification sequence.

The processing unit 720 is specifically configured to determine the first time length according to the at least one identification sequence.

Optionally, if the first message indicates the first time length, the first message indicates the first time length by indicating a numerical relationship between a first parameter and the first time length, wherein the first parameter is a Discontinuous Reception (DRX) parameter or a first time parameter. The communication unit 710 is further configured to send first configuration information to the terminal device through Radio Resource Control (RRC) signaling, wherein the first configuration information indicates whether to monitor the PDCCH within the first time length.

Optionally, the network device 700 further includes a processing unit 720, configured to determine the first time length according to the first message and the first parameter, and determine whether to send the PDCCH for the terminal device within the first time length according to the first configuration information.

Optionally, if the first parameter is the DRX parameter, the first parameter is one of the following:

a DRX-on duration timer, a DRX-inactivity timer, a DRX-long cycle, and a DRX-short cycle.

Optionally, the communication unit 710 is further configured to send the first parameter to the terminal device through RRC signaling or Media Access Control Control Element (MAC CE) signaling.

Optionally, the communication unit 710 is further configured to send the first time parameter to the terminal device through RRC signaling or MAC CE signaling.

Optionally, the communication unit 710 is further configured to send the first configuration parameter to the terminal device through RRC signaling or MAC CE signaling.

Optionally, the first message is PDCCH, and the first message indicates the first time length by indicating the numerical relationship between the first parameter and the first time length through at least one bit in the first DCI transmitted on the first message.

The processing unit 720 is specifically configured to determine the first time length according to the at least one bit and the first parameter.

Optionally, the first message is an identification sequence, and the first message indicates the first time length by indicating the numerical relationship between the first parameter and the first time length through at least one identification sequence.

The processing unit 720 is specifically configured to determine the first time length according to the at least one identification sequence and the first parameter.

Optionally, if the first message indicates whether to monitor the PDCCH within the first time length, the communication unit is further configured to send second configuration information to the terminal device through RRC signaling, and the second configuration information indicates the first time length. The processing unit 720 is specifically configured to determine the first time length according to the second configuration information, and determine whether to send the PDCCH for the terminal device within the first time length according to the first message.

Optionally, the first message is PDCCH, and the first message indicates whether to monitor the PDCCH within the first time length through a first bit in first DCI transmitted on the first message. Wherein when the first bit is 0, it indicates to monitor the PDCCH within the first time length, and when the first bit is 1, it indicates not to monitor the PDCCH within the first time length.

The processing unit 720 is specifically configured to, if the first bit is 0, determine to send the PDCCH for the terminal device within the first time length according to the first bit, or, if the first bit is 1, determine not to send the PDCCH for the terminal device within the first time length according to the first bit.

Optionally, the first message is an identification sequence, and the first message indicates through a first identification sequence to monitor the PDCCH within the first time length, and indicates through a second identification sequence not to monitor the PDCCH within the first time length.

The processing unit 720 is specifically configured to, if the first message includes the first identification sequence, determine to send the PDCCH for the terminal device within the first time length according to the first identification sequence, or, if the first message includes the second identification sequence, determine not to send the PDCCH for the terminal device within the first time length according to the second identification sequence.

Optionally, if the first message indicates the first time length and indicates whether to monitor the PDCCH within the first time length, the processing unit 720 is specifically configured to determine the first time length and whether to send the PDCCH for the terminal device within the first time length according to the first message.

Optionally, the first message includes first indication information indicating the first time length and second indication information indicating whether to monitor the PDCCH within the first time length. The processing unit 720 is specifically configured to determine the first time length according to the first indication information, and determine whether to send the PDCCH for the terminal device within the first time length according to the second indication information.

Optionally, the first message is PDCCH and/or an identification sequence.

Optionally, the first indication information indicates the first time length through at least one bit in the first DCI transmitted on the first message; and the processing unit 720 is specifically configured to determine the first time length according to the at least one bit.

Optionally, the first indication information indicates the first time length through at least one identification sequence; and the processing unit 720 is specifically configured to determine the first time length according to the at least one identification sequence.

Optionally, the second indication information indicates whether to monitor the PDCCH within the first time length through a first bit in the second DCI transmitted on the first message, wherein when the first bit is 0, it indicates to monitor the PDCCH within the first time length, and when the first bit is 1, it indicates not to monitor the PDCCH within the first time length. The processing unit 720 is specifically configured to, if the first bit is 0, determine to send the PDCCH for the terminal device within the first time length according to the first bit, or, if the first bit is 1, determine not to send the PDCCH for the terminal device within the first time length according to the first bit.

Optionally, the second indication information indicates through a first identification sequence to monitor the PDCCH within the first time length, and indicates through a second identification sequence not to monitor the PDCCH within the first time length. The processing unit 720 is specifically configured to, if the first message includes the first identification sequence, determine to send the PDCCH for the terminal device within the first time length according to the first identification sequence, or, if the first message includes the second identification sequence, determine not to send the PDCCH for the terminal device within the first time length according to the second identification sequence.

Optionally, if the first message indicates the first time length and indicates whether to monitor the PDCCH within the first time length, wherein the first message indicates the first time length by indicating a numerical relationship between a first parameter and the first time length, and the first parameter is a DRX parameter or a first time parameter. The network device 700 further includes a processing unit 720, configured to determine the first time length according to the first message and the first parameter, and determine whether to send the PDCCH for the terminal device within the first time length according to the first message.

Optionally, if the first parameter is the DRX parameter, the first parameter is one of the following:
a DRX-on duration timer, a DRX-inactivity timer, a DRX-long cycle, and a DRX-short cycle.

Optionally, the communication unit 710 is further configured to send the first parameter to the terminal device through RRC signaling or MAC CE signaling.

Optionally, the communication unit 710 is further configured to send the first time parameter to the terminal device through RRC signaling or MAC CE signaling.

Optionally, the first message includes first indication information and second indication information, wherein the first indication information indicates the first time length by indicating the numerical relationship between the first parameter and the first time length, and the second indication information indicates whether to monitor the PDCCH within the first time length. The processing unit 720 is specifically configured to determine the first time length according to the first indication information and the first parameter, and determine whether to send the PDCCH for the terminal device within the first time length according to the second indication information.

Optionally, the first message is PDCCH and/or an identification sequence.

Optionally, the first indication information indicates the first time length by indicating the numerical relationship between the first parameter and the first time length through at least one bit in the first DCI transmitted on the first message.

The processing unit 720 is specifically configured to determine the first time length according to the at least one bit and the first parameter.

Optionally, the first indication information indicates the first time length by indicating the numerical relationship between the first parameter and the first time length through at least one identification sequence. The processing unit 720 is specifically configured to determine the first time length according to the at least one identification sequence and the first parameter.

Optionally, the second indication information indicates whether to monitor the PDCCH within the first time length through a first bit in the second DCI transmitted on the first message, wherein when the first bit is 0, it indicates to monitor the PDCCH within the first time length, and when the first bit is 1, it indicates not to monitor the PDCCH within the first time length. The processing unit 720 is specifically configured to, if the first bit is 0, determine to send the PDCCH for the terminal device within the first time length according to the first bit, or, if the first bit is 1, determine not to send the PDCCH for the terminal device within the first time length according to the first bit.

Optionally, the second indication information indicates through a first identification sequence to monitor the PDCCH within the first time length, and indicates through a second identification sequence not to monitor the PDCCH within the first time length. The processing unit 720 is specifically configured to, if the first message includes the first identification sequence, determine to send the PDCCH for the terminal device within the first time length according to the first identification sequence, or, if the first message includes the second identification sequence, determine not to send the PDCCH for the terminal device within the first time length according to the second identification sequence.

Optionally, a unit of the first time length is a time slot or a millisecond.

Optionally, if the unit of the first time length is the time slot, the first message includes third indication information indicating a subcarrier spacing corresponding to the first time length or indicating that the subcarrier spacing corresponding to the first time length is consistent with the subcarrier spacing corresponding to the PDCCH.

Optionally, the terminal device is in an RRC connection state.

It should be understood that the network device 700 may correspond to the network device in the method 300, and may implement corresponding operations implemented by the network device in the method 300. For the sake of brevity, those will not be repeated here.

Figure 9:
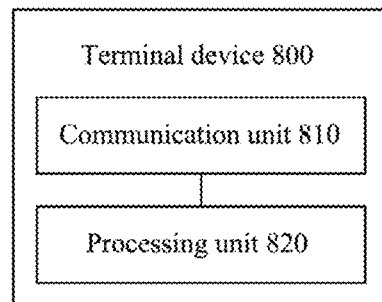
FIG. 9 is a schematic block diagram of another terminal device according to an implementation of the present disclosure.

FIG. 9 is a schematic block diagram of a terminal device 800 according to an implementation of the present disclosure. The terminal device 800 includes a processing unit 810 and a communication unit 820.

The processing unit 810 is configured to determine a first time length according to a first message and a first parameter, wherein the first message indicates a numerical relationship between the first parameter and the first time length, and the first parameter is a Discontinuous Reception (DRX) parameter or a first time parameter.

The communication unit 820 is configured to skip monitoring a Physical Downlink Control CHhannel (PDCCH) within the first time length.

Optionally, if the first parameter is the DRX parameter, the first parameter is one of the following:

a DRX-on duration timer, a DRX-inactivity timer, a DRX-long cycle, and a DRX-short cycle.

Optionally, the communication unit 820 is further configured to receive the first parameter sent by a network device through Radio Resource Control (RRC) signaling or Media Access Control Control Element (MAC CE) signaling.

Optionally, the first time parameter is notified by the network device or pre-configured.

Optionally, the communication unit 820 is further configured to receive the first message sent by a network device.

Optionally, the communication unit 820 is specifically configured to receive periodically the first message sent by the network device.

Optionally, the period in which the communication unit 820 receives the first message is greater than or equal to that in which the communication unit 820 monitors the PDCCH.

Optionally, the first message is PDCCH, and the first message indicates the numerical relationship between the first parameter and the first time length through at least one bit in the first DCI transmitted on the first message. The processing unit 810 is specifically configured to determine the first time length according to the at least one bit and the first parameter.

Optionally, the first message is an identification sequence, and the first message indicates the numerical relationship between the first parameter and the first time length through at least one identification sequence. The processing unit 810 is specifically configured to determine the first time length according to the at least one identification sequence and the first parameter.

Optionally, a unit of the first time length is a time slot or a millisecond.

Optionally, if the unit of the first time length is the time slot, the first message includes first indication information indicating a subcarrier spacing corresponding to the first time length or indicating that the subcarrier spacing corresponding to the first time length is consistent with the subcarrier spacing corresponding to the PDCCH.

Optionally, the terminal device is in an RRC connection state.

It should be understood that the terminal device 800 may correspond to the terminal device in the method 400, and may implement corresponding operations implemented by the terminal device in the method 400. For the sake of brevity, those will not be repeated here.

Figure 10:
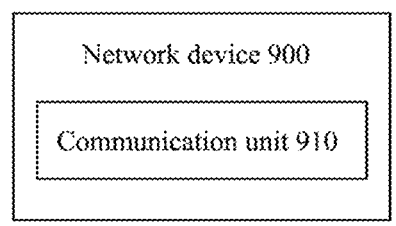
FIG. 10 is a schematic block diagram of another network device according to an implementation of the present disclosure.

FIG. 10 is a schematic block diagram of a network device 900 according to an implementation of the present disclosure. The network device 900 includes a communication unit 910, configured to send a first message to a terminal device, wherein the first message indicates a numerical relationship between a first parameter and a first time length, and the first parameter is a Discontinuous Reception (DRX) parameter or a first time parameter.

Optionally, if the first parameter is the DRX parameter, the first parameter is one of the following:

a DRX-on duration timer, a DRX-inactivity timer, a DRX-long cycle, and a DRX-short cycle.

Optionally, the communication unit 910 is further configured to send the first parameter to the terminal device through RRC signaling or MAC CE signaling.

Optionally, the communication unit 910 is further configured to send the first time parameter to the terminal device through RRC signaling or MAC CE signaling.

Optionally, the communication unit 910 is specifically configured to send periodically the first message to the terminal device.

Optionally, the period in which the network device 900 sends the first message is greater than or equal to that in which the terminal device monitors the PDCCH.

Optionally, the first message is PDCCH, and the first message indicates the numerical relationship between the first parameter and the first time length through at least one bit in the first DCI transmitted on the first message.

Optionally, the first message is an identification sequence, and the first message indicates the numerical relationship between the first parameter and the first time length through at least one identification sequence.

Optionally, a unit of the first time length is a time slot or a millisecond.

Optionally, if the unit of the first time length is the time slot, the first message includes first indication information indicating a subcarrier spacing corresponding to the first time length or indicating that the subcarrier spacing corresponding to the first time length is consistent with the subcarrier spacing corresponding to the PDCCH.

Optionally, the terminal device is in an RRC connection state.

It should be understood that the network device 900 may correspond to the network device in the method 500, and may implement corresponding operations implemented by the network device in the method 500. For the sake of brevity, those will not be repeated here.

Figure 11:
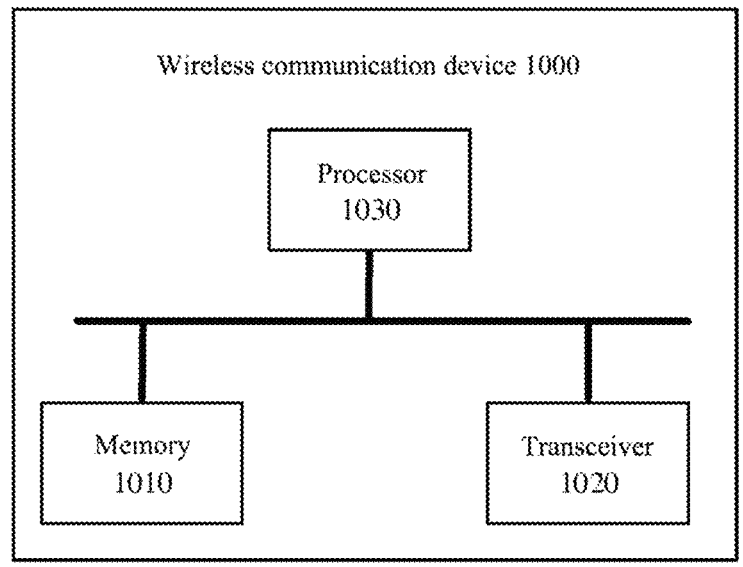
FIG. 11 shows a schematic block diagram of a device for wireless communication provided by an implementation of the present disclosure.

FIG. 11 shows a schematic block diagram of a device 1000 for signal transmission provided by an implementation of the present disclosure. The device 1000 includes a memory 1010, a transceiver 1020 and a processor 1030.

The memory 1010 is configured to store a program including codes.

The transceiver 1020 is configured to communicate with other devices.

The processor 1030 is configured to execute program codes in the memory 1010.

Optionally, the transceiver 1020 is configured to perform specific transmitting and receiving of signals under the driving of the processor 1030.

Optionally, when the codes are executed, the processor 1030 may also implement various operations performed by the terminal device in the method 200 in FIG. 2, which will not be repeated here for brevity. In this case, the device 1000 may be a terminal device (e.g., a mobile phone).

Optionally, when the codes are executed, the processor 1030 may also implement various operations performed by the terminal device in the method 400 in FIG. 5, which will not be repeated here for brevity. In this case, the device 1000 may be a terminal device (e.g., a mobile phone).

Optionally, when the codes are executed, the processor 1030 may also implement various operations performed by the network device in the method 300 in FIG. 3, which will not be repeated here for brevity. In this case, the device 1000 may be a network device (e.g., a base station).

Optionally, when the codes are executed, the processor 1030 may also implement various operations performed by the network device in the method 500 in FIG. 6, which will not be repeated here for brevity. In this case, the device 1000 may be a network device (e.g., a base station).

It should be understood that in an implementation of the present disclosure, the processor 1030 may be a Central Processing Unit (CPU), or the processor 1030 may be other general purpose processors, digital signal processors (DSP), application specific integrated circuits (ASIC), Field programmable gate arrays (FPGA) or other programmable logic devices, discrete gate or transistor logic devices, discrete hardware components, etc. The general purpose processor may be a microprocessor or the processor may be any conventional processor or the like.

The memory 1010 may include a read-only memory and a random access memory, and provide instructions and data to the processor 1030. A portion of memory 1010 may include non-volatile random access memory. For example, the memory 1010 may also store information of device type.

The transceiver 1020 may be used for implementing signal transmission and reception functions, such as frequency modulation and demodulation functions, or up-conversion and down-conversion functions.

In the implementation process, at least one act of the method may be completed by an integrated logic circuit of hardware in the processor 1030, or the integrated logic circuit may complete the at least one act under the driving of instructions in a form of software. Therefore, the device 1000 for wireless communication may be a chip or chipset. The acts of the method disclosed in connection with implementations of the present disclosure may be directly embodied to be completed by an execution of a hardware processor or by a combination of hardware and software modules in a processor. The software modules may be located in a storage medium commonly used in the art, such as a random access memory, flash memory, read-only memory, programmable read-only memory or electrically erasable programmable memory, or register. The storage medium is located in the memory, and the processor 1030 reads the information in the memory and accomplishes the acts of the method with its hardware. In order to avoid repetition, it will not be described in detail here.

Figure 12:
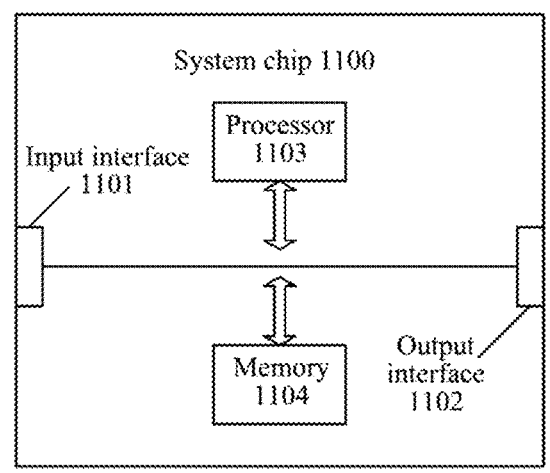
FIG. 12 is a schematic structural diagram of a system chip according to an implementation of the present disclosure.

FIG. 12 is a schematic block diagram of a system chip 1100 according to an implementation of the present disclosure. The system chip 1100 of FIG. 12 includes an input interface 1101, an output interface 1102, a processor 1103 and a memory 1104, and the processor 1103 and the memory 1104 may be connected through internal communication connection lines, and the processor 1103 is used for executing codes in the memory 1104.

Optionally, when the codes are executed, the processor 1103 implements the method performed by the terminal device in the method implementation. For brevity, it will not be repeated here.

Optionally, when the codes are executed, the processor 1103 implements the method performed by the network device in the method implementation. For brevity, it will not be repeated here.

The above implementations may be implemented in whole or in part by software, hardware, firmware, or any combination thereof. When the implementations are implemented through software, they may be implemented in whole or in parts in the form of a computer program product. The computer program product includes one or more computer instructions. When the computer program instructions are loaded and executed on a computer, the processes or functions described in the implementations of the present disclosure are generated in whole or in part. The computer may be a general purpose computer, a special purpose computer, a computer network, or other programmable apparatus. The computer instructions may be stored in a computer-readable storage medium or transmitted from one computer-readable storage medium to another. For example, the computer instructions may be transmitted from one website site, computer, server or data center to another website site, computer, server or data center by a wired (e.g., coaxial cable, optical fiber, digital subscriber line (DSL)) or wireless (e.g., infrared, wireless, microwave and the like) manner. The computer-readable storage medium may be any available medium that a computer may access or a data storage device such as a server, a data center, or the like that integrates one or more available medium. The available medium may be a magnetic medium (e.g., floppy disk, hard disk, magnetic tape), an optical medium (e.g., DVD), or a semiconductor medium (e.g., Solid State Disk (SSD)) or the like.

It should be understood that in various implementations of the present disclosure, sequence numbers of the various processes do not imply an order of execution of the various processes, the order of execution of the various processes should be determined by functions and internal logics of the various processes, and should not constitute any limitation on implementation processes of the implementations of the present disclosure.

Those skilled in the art may clearly understand that for convenience and conciseness of description, the specific working processes of the system, apparatus and unit described above may refer to the corresponding processes in the aforementioned method implementations and will not be repeated here.

What are described above are merely specific implementations of the present disclosure, but the protection scope of the present disclosure is not limited thereto. Any change or substation that may be easily conceived by a person skilled in the art within the technical scope disclosed by the present disclosure shall be included within the protection scope of the present disclosure. Therefore, the protection scope of the present disclosure shall be subject to that of the claims.

What we claim is:

1. A method for monitoring a Physical Downlink Control Channel (PDCCH), comprising:
    sending, by a network device, a first message to a terminal device; wherein when the first message indicates not to monitor a PDCCH within a first time length, the first message is used for the terminal device not to perform monitoring the PDCCH within the first time length; and when the first message indicates to monitor the PDCCH within the first time length, the first message is used for the terminal device to monitor the PDCCH within the first time length,
    wherein the first message is Downlink Control Information, DCI, used for uplink and downlink scheduling,
    wherein before sending, by the network device, the first message to the terminal device, the method further comprises:

sending, by the network device, second configuration information, wherein the second configuration information is used for indicating the first time length, wherein the first message comprises a first bit;

when the first bit is 0, the first message indicates to monitor the PDCCH within the first time length, and when the first bit is 1, the first message indicates not to monitor the PDCCH within the first time length.

2. The method of claim 1, wherein a unit of the first time length is a time slot or a millisecond.

3. The method of claim 1, wherein the terminal device is in a Radio Resource Control (RRC) connection state.

4. The method of claim 1, wherein the second configuration information is Radio Resource Control, RRC, signaling.

5. The method of claim 1, wherein the first time length comprises all or a part of a PDCCH monitoring window.

6. The method of claim 5, wherein configuration of the PDCCH monitoring window is used for the terminal device to monitor the PDCCH out of the first time length.

7. The method of claim 5, wherein configuration of the PDCCH monitoring window comprises:
configuration of the PDCCH, and/or
configuration of Discontinuous Reception, DRX.

8. A network device, comprising:
a transceiver, configured to send a first message to a terminal device; wherein when the first message indicates not to monitor a PDCCH within a first time length, the first message is used for the terminal device not to perform monitoring the PDCCH within the first time length; and when the first message indicates to monitor the PDCCH within the first time length, the first message is used for the terminal device to monitor the PDCCH within the first time length, wherein the first message is Downlink Control Information, DCI, used for uplink and downlink scheduling, wherein the transceiver is further configured to send second configuration information, wherein the second configuration information is used for indicating the first time length, wherein the first message comprises a first bit;

when the first bit is 0, the first message indicates to monitor the PDCCH within the first time length, and when the first bit is 1, the first message indicates not to monitor the PDCCH within the first time length.

9. The network device of claim 8, wherein a unit of the first time length is a time slot or a millisecond.

10. The network device of claim 8, wherein the terminal device is in a Radio Resource Control (RRC) connection state.

11. The network device of claim 8, wherein the second configuration information is Radio Resource Control, RRC, signaling.

12. The network device of claim 8, wherein the first time length comprises all or a part of a PDCCH monitoring window.

13. The network device of claim 12, wherein configuration of the PDCCH monitoring window is used for the terminal device to monitor the PDCCH out of the first time length.

14. The network device of claim 13, wherein configuration of the PDCCH monitoring window comprises:
configuration of the PDCCH, and/or
configuration of Discontinuous Reception, DRX.

* * * * *